(12) United States Patent
Pietrowicz

(10) Patent No.: US 6,978,313 B1
(45) Date of Patent: Dec. 20, 2005

(54) METHOD AND SYSTEM FOR TRANSPORTING GENERIC DATA MESSAGES OVER THE PUBLIC SWITCHED TELEPHONE NETWORK TO CUSTOMER PREMISES EQUIPMENT WITHOUT ESTABLISHING A CALL

(75) Inventor: Stanley Pietrowicz, Freehold, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 651 days.

(21) Appl. No.: 09/626,437

(22) Filed: Jul. 27, 2000

Related U.S. Application Data

(60) Provisional application No. 60/146,510, filed on Jul. 30, 1999.

(51) Int. Cl.[7] .................. G06F 15/173; H04M 7/00; H04M 3/00
(52) U.S. Cl. ................. 709/238; 379/270; 379/221.08; 379/221.13
(58) Field of Search ................. 709/217, 238, 709/239, 240, 241–4; 379/207, 112, 212, 379/230, 221.08, 221.13; 370/270, 271, 307, 370/351, 535

(56) References Cited

U.S. PATENT DOCUMENTS

| | | | |
|---|---|---|---|
| 4,756,020 A * | 7/1988 | Fodale ................... | 379/114.14 |
| 5,189,694 A | 2/1993 | Garland ...................... | 379/106 |
| 5,247,571 A * | 9/1993 | Kay et al. .............. | 379/221.09 |
| 5,394,461 A | 2/1995 | Garland ...................... | 379/106 |
| 5,544,161 A | 8/1996 | Bigham et al. ............ | 370/58.1 |
| 5,680,437 A | 10/1997 | Segal .......................... | 379/10 |
| 5,751,707 A | 5/1998 | Voit et al. .................. | 370/384 |
| 6,047,330 A * | 4/2000 | Stracke, Jr. ................. | 709/238 |
| 6,385,647 B1 * | 5/2002 | Willis et al. ................ | 709/217 |
| 6,405,251 B1 * | 6/2002 | Bullard et al. .............. | 709/224 |

OTHER PUBLICATIONS

Telcordia Technologies, Inc., "LSSGR: Voiceband Data Transmission Interface," Generic Requirements GR-30-CORE, Issue 2, Section 6.6., Dec. 1998.

Nortel Networks, Inc., "Suppressed Ringing Access (SRA)," Functional Description (FN), ag4004fn.ac031, pp. 1-60.

Telcordia Technologies, Inc., "LSSGR: Visual Message Waiting Indicator Generic Requirements (FSD Jan. 2, 2000)—A Module of LSSGR, FR-64", Telcordia Technologies Generic Requirements, GR-1401-CORE, Issue 1, Jun. 2000 (Formerly TR-NWT-001401, Issue 1, Sep. 1993).

(Continued)

Primary Examiner—David Wiley
Assistant Examiner—Arrienne M. Lezak
(74) Attorney, Agent, or Firm—William A. Schoneman; Joseph Giordano; Glen Farbanish

(57) ABSTRACT

Methods and systems are disclosed for transferring service application data from a server to a subscriber device via the PSTN without establishing a call between the server and subscriber device and without the PSTN switching components having inherent knowledge as to the data content. The server defines a generic request message, which contains the service application data and data delivery instructions. This generic request message is delivered to the subscriber's terminating switch, which subsequently delivers the service application data to the subscriber based on the data delivery instructions. The terminating switch then defines a generic response message and delivers it to the server, informing the server as to status of the data delivery. Similarly, methods and systems are also taught for broadcasting data from a server to a plurality of devices via the PSTN.

34 Claims, 7 Drawing Sheets

OTHER PUBLICATIONS

Telcordia Technologies, Inc., "ISDN Message Service Generic Switching and Signaling Requirements," Generic Requirements GR-866-CORE, Issue 1, Jun. 1995 with Revision 1, Feb. 1999.

Telcordia Technologies, Inc., "AINGR: Switching Systems (a module of AINGR, FR-15)," Telcordia Technologies Generic Requirements, GR-1298-CORE, Issue 5, Nov. 1999.

* cited by examiner

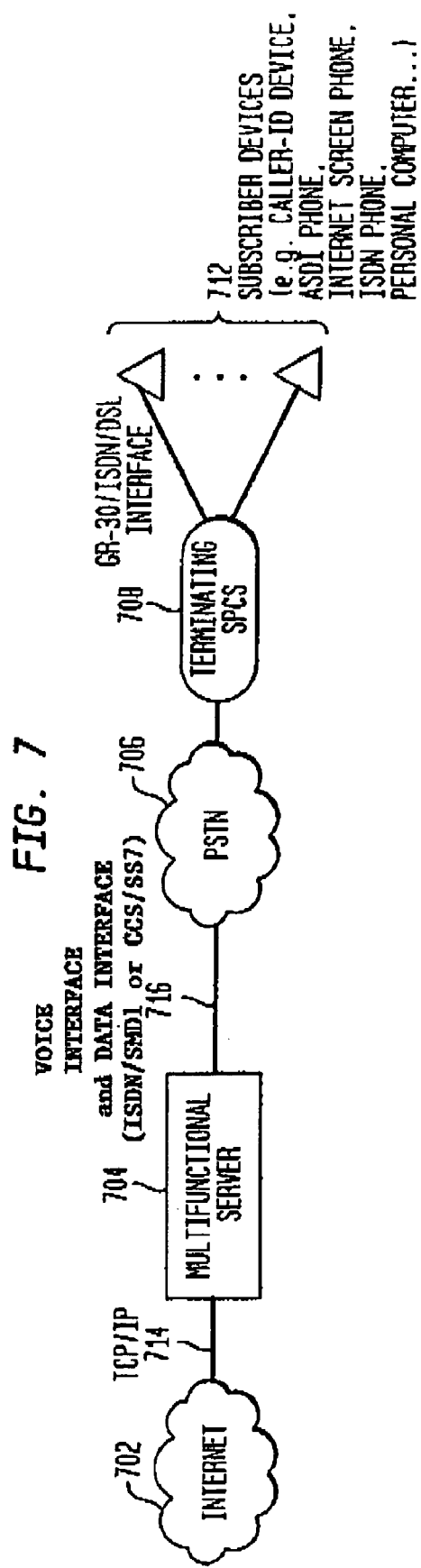

METHOD AND SYSTEM FOR TRANSPORTING GENERIC DATA MESSAGES OVER THE PUBLIC SWITCHED TELEPHONE NETWORK TO CUSTOMER PREMISES EQUIPMENT WITHOUT ESTABLISHING A CALL

CROSS-REFERENCE TO RELATED APPLICATIONS

This application claims the benefit of U.S. Provisional Application No. 60/146,510, filed Jul. 30, 1999, the contents of which are incorporated herein by reference.

BACKGROUND OF THE INVENTION 1.0 Field of the Invention

My invention relates generally to transferring data from a server to a subscriber device via the Public Switched Telephone Network (PSTN). More particularly, my invention relates to methods and systems for transferring data from a server to a subscriber device via the PSTN without establishing a call between the server and subscriber device and without the PSTN switching components having inherent knowledge as to the data content.

2.0 Description of the Background

The rise of alternate forms of communication and the ever present need for public safety are several trends fueling the need for a large-scale data distribution capability that can provide timely and efficient delivery of information to residential subscribers. With respect to alternate forms of communication, many business subscribers have the benefit of dedicated Internet access and typically carry a wireless device. As a result, they have the ability to receive timely/instantaneous notification of new awaiting email and network-based faxes, and can be paged and receive short text messages via wireless communications. Dedicated Internet access also allows content providers and advertisers to push information, such as stock quotes and targeted marketing information, to these subscribers via emerging "push-information technologies."

However, unlike business subscribers, typical residential subscribers do not have dedicated Internet access and usually do not carry wireless devices. As a result, convenient and timely methods for notifying these subscribers of pending email and fax information or to automatically "push" new forms of information into their homes do not exist unless these subscribers first physically access their Internet service providers. Similarly, Convergent Services (e.g., Unified Messaging) have emerged that combine the capabilities of both the PSTN and Internet and provide subscribers with a unique mix of voice and data services. However, again, subscribers must physically access a server to determine if there is pending information.

Public safety has also created a need for information distribution to the residential subscriber. Existing public alerting methods, such as community sirens that are external to the home, are proving to be insufficient and in some cases ineffective as the population grows and settles in new remote areas. As a result, there is a need for public warning and emergency alerting systems resident within the home that can alert a given population as to the onset of severe weather or flood, the need to evacuate, a missing child, water contamination, potential industrial hazard, etc.

Needs like those presented above can be effectively satisfied through a data-oriented message distribution system that can send "data" from a "central server" to a subscriber device. Such "data" could be a short text message providing a public warning, Internet-based advertisement/stock quotes, or a page-like message. The data could also alert subscribers of pending information and prompt them for information retrieval.

Although tomorrow's "Next Generation Networks" provide great flexibility for data transport that could meet these emerging subscriber needs, these solutions lack widespread ubiquitous deployment today. In contrast, the current PSTN has nearly ubiquitous deployment and continues to host a large volume of subscribers. Consequently, a solution that could deliver data messages to subscribers based on today's PSTN has tremendous value and potential because it would not require the need to deploy a second data network. A conceptual diagram of such a system is shown in FIG. 1. Central server 102 aims to deliver and exchange data/voice information with a plurality of subscriber CPE devices, 106, through PSTN infrastructure 104.

Although the PSTN offers ubiquitous access, there are several reasons as to why it is not an ideal network to implement data-oriented network messaging capabilities. First, the PSTN has been traditionally optimized to transport and switch telephone voice traffic and is therefore characterized by fixed bandwidth, making it non-ideal for data transport. Second, because the PSTN is designed around the central concept of a telephone call, two endpoints cannot communicate with one another without first establishing a switched connection. Call connection establishment is slow and ties up switch and network resources making the network inefficient for large-scale distribution of data, especially for broadcast types of applications where time is critical (e.g., as would be needed by alerting systems). In addition, call connection establishment does not effectively meet the subscriber needs presented above. To be effective, the delivery of data messages needs to occur without requiring subscriber interaction and irrespective of whether the subscriber line is idle or in use. Ideally, a solution based on the PSTN should only utilize the PSTN's connectivity infrastructure to deliver data message from the central server to the subscriber-based CPE devices.

Another issue with the PSTN is that service applications traditionally must be deployed within the internal PSTN switching components and require the switching components have specific knowledge of the application in at least two ways: (1) the means by which a terminating switch must establish a connection to a subscriber device and deliver data to this device, and (2) the data formats used by the service application to transport information through the network. As a result, service applications and switching components are tied together and a given service application cannot readily support other types of services without modifying the application. Hence, each time a new service is deployed, the PSTN switching components must be re-programmed, which is both costly and time consuming. As will be presented below, my invention overcomes this limitation by defining a generic framework within the PSTN infrastructure that can support numerous services thereby severing the overriding application from the PSTN infrastructure. As a result, service application development and deployment are performed on the network endpoints (i.e., a central server and CPE devices), which are less costly and time consuming to enhance. These service applications then utilize the generic framework of my invention without modifying the switching components.

3.0 Prior Art Systems

Prior art systems have been developed that allow a central server (central server will be used generically in the description of the prior art systems) to send data to a subscriber CPE device through the PSTN. However, in addition to the concerns mentioned above related to bandwidth limitations, call-establishment delays, and application deployment, these systems do not address issues related to Local Number Portability (LNP) and do not provide a cost-effective and timely way to broadcast information to numerous subscribers. As a result, these systems do not adequately address the emerging and changing needs of today's residential subscriber.

In U.S. Pat. Nos. 5,189,694 and 5,394,461, Stuart Garland teaches a system, as shown in FIG. 2, whereby central server 202 has a dedicated direct "Utility Telemetry Trunk" (UTT) connections, 204–208, through the PSTN to each of a plurality of Stored Program Control Systems (SPCS) 210–214, serving desired CPE devices, 216–220. (Note that Garland utilizes a "central office service unit" and "utility controller" that can be collectively treated as a central server for the purposes of this discussion.) However, Garland's implementation posses several drawbacks with respect to the delivery of data messages through the PSTN.

First, the system is not a true network-based solution and therefore does not efficiently provide ubiquitous access to all subscribers. Central server 202 requires a UTT trunk to a given SPCS before it can communicate with the CPE served by that SPCS. Hence, the solution does not cost effectively scale to serve all CPE in a network.

Second, to address LNP related issues, the central server requires a UTT connection to every service provider/SPCS that may serve a given subscriber. If there is no UTT connection, the subscriber cannot be reached. In addition, the central server requires a database to keep track of ported subscribers.

Third, the solution does not provide for efficient data transfer. All communications between a central server and CPE device require a switched voice connection be established through a UTT and the switching matrix of a SPCS. Voice connections are time-consuming to establish and are inherently slow for the transmission of data. In addition, during broadcast scenarios, numerous voice connections can create switch congestion and therefore call blocking.

Fourth, the solution does not provide a cost-effective broadcast solution, as would be needed, for example, by an emergency alerting application. Garland does describe a two-phase broadcast capability whereby a central server first delivers pre-determined broadcast-instructions (including a broadcast list of numbers) to a SPCS. The central server then delivers to the SPCS in a second message the data to be broadcast. However, this solution is again hindered by the fact that large-scale broadcast requires the central server have a UTT trunk to every switch. Another issue is that due to the speed of the UTT trunk, it is time consuming to dynamically download new broadcast lists, a feature that is required for delivering natural disaster information.

Advantageously, Garland's system has a mechanism for severing an overriding service application from the PSTN switching components, but this mechanism has limitations. Specifically, Garland defines a control mechanism by which the central server can choose from one of several predefined transport services, whereby a transport service instructs the SPCS on how to establish the connection to the CPE and how to transport data to the CPE over the access loop. However, because Garland's system utilizes a "GR-30-CORE" interface (as defined in *GR-30-CORE LSSGR Voiceband Data Transmission Interface, Section* 6.6, by Telcordia Technologies, Inc.) between the SPCS and CPE, each transport service has a predefined data format for transmission. Hence, the transport services are inherently based on certain types of service applications and as a result, there is an inherent limitation as to the types of applications that can be implemented on this system without the continuous definition of new transport services. New transport services require re-programming of the PSTN switching components.

Nortel Networks, Inc. describes in functional feature document, *Suppressed Ringing Access*, a system for establishing a suppressed ringing access call connection between a central server and a subscriber device through the use of a modified version of Integrated Services Digital Network (ISDN) call setup (ISDN and CCS/SS7 call establishment do not support signaling for suppressed ringing access). Under this system, a central server places a call to a service activating directory number/application on the terminating SPCS that serves the subscriber. The SPCS-based application then completes the suppressed ringing access connection to the subscriber. Because the system utilizes ISDN call setup procedures, there is no need for dedicated trunks, as is the case with Garland, thereby making the system ubiquitous and scalable (i.e., the call connection is switched through the network). However, the system still poses several drawbacks making it non-ideal for data message transport.

First, similar to Garland, the transmission of data between the central server and CPE device utilizes a switch-based voice connection. This connection is time consuming to establish, especially when having to make numerous connections such as for broadcast applications.

Second, the system has LNP related issues for ported subscribers because the central server places the call to a switched-based application on the SPCS rather than directly to the subscriber. Hence, the call establishment procedures do not inherently resolve the subscriber's number and reroute the call. To solve this LNP issue, the SPCS would need to maintain a local database of ported numbers, which is costly.

Third, the application is inherently tied to the PSTN switching components and therefore lacks flexibility to support other applications. Unlike Garland, the system does not define a control mechanism between the central server and terminating SPCS whereby the server can instruct the SPCS on how to establish the connection to the CPE device. Call establishment procedures are hardcoded in the SPCS based application.

Lastly, the system only supports subscriber broadcast by sending individual messages to each subscriber, which is inefficient.

Telcordia Technologies, Inc. defined a message waiting notification service in, *TR-NWT*-1401: *LSSGR Visual Message Waiting Indicator*, and *GR*-866-*CORE: ISDN Message Service Generic Switching and Signaling Requirements*, as shown in FIG. 3. Under this service, network-based voicemail system 302 (the central server for the purposes of this discussion) records voice messages for a subscriber. System 302 then notifies the subscriber that new voice messages are waiting by activating an indicator on subscriber CPE device 316 as follows. Voicemail system 302 sends a message, describing the subscriber's incoming call history, to originating SPCS 306 over access link 304, which is either an ISDN/Message Desk Interface (MDI) or a Simplified Message Desk Interface (SMDI). Originating SPCS 306 in turn notifies terminating SPCS 312 of the call history by launching a "Transaction Capabilities Application Part" (TCAP) query over CCS network 308. SPCS 312 then notifies CPE device 316 of the call history by sending a message over access link 314 using either a GR-30-CORE predefined message or through ISDN non-call associated signaling.

Because this solution utilizes the CCS/SS7 network, it advantageously supports the delivery of data from a central server to a subscriber without the need to establish a voice connection. It also addresses ported numbers. However, this system has several drawbacks making it non-ideal for data message transport.

First, the solution is tailored towards a specific application (voicemail notification) and is therefore not adaptable to applications requiring other forms of message transfer. Specifically, the protocols defined for transporting data from the voicemail system to the originating SPCS, between the originating and terminating SPCS's, and from the terminating SPCS to the CPE device are specific to the transport of voicemail information and are not adaptable to the transport of any data (i.e., the data content is limited in both size and type). In addition, the system does not define a mechanism for the central server to instruct the terminating SPCS on how to establish the connection from the terminating SPCS to the CPE device. Both issues prevent the system from supporting service applications other than voicemail without modification to the PSTN switching components.

Second, the solution does not support a broadcast mechanism from the central server to a plurality of subscribers. The central server could broadcast a message, one-at-a-time to numerous subscribers, but this is time-consuming and could potentially create congestion within the CCS/SS7 network.

Telcordia Technologies, Inc. also defined an AIN function, called the "Create-Call" function, in *GR-1298-CORE: AINGR: Switching Systems*. This function permits a Service Control Point (SCP) to request that a switch establish a call on behalf of a subscriber CPE device. Specifically, through this function the SCP can instruct a switch to first alert a CPE device and then establish a call to a central server (e.g., an Intelligent Peripheral) from this device. Unlike the systems described above, here the call is originated from the subscriber rather than from the central server. One application of this function is to setup an unattended call between an Intelligent Peripheral and an ADSI screen-phone to download service scripts.

The Create-Call function poses several drawbacks making it non-ideal for data message transport. First, the function does not support efficient broadcast from a central server since call origination occurs from the CPE device to the central server. Second, the function does not provide for efficient data transfer since all communications between a central server and CPE device require a switched voice connection. Third, the function is limited with respect to the types of data that can be sent to a CPE device.

SUMMARY OF THE INVENTION

It is desirable to have a method and apparatus for efficiently exchanging data-oriented messages from a service application residing on a central server to subscriber CPE devices over the PSTN network that overcome the above and other disadvantages of the prior art. Methods consistent with my invention deliver service application data from a central server to a subscriber device by means of the PSTN network. It is an objective of my invention that this data delivery be generic such that only the central server and subscriber device have inherent knowledge of the application data. The PSTN infrastructure, consisting of an originating SPCS serving the central server, a terminating SPCS serving the subscriber device, and a signaling network interconnecting the originating and terminating SPCS's, have no embedded knowledge of the application data and simply treat the data as generic. As a result of my invention, new service applications are severed from the PSTN infrastructure in that these services can be deployed between a central server and CPE device without modifying the internal PSTN infrastructure.

Specifically, under my invention, the central server accepts data from a service application and defines a generic request message, which contains the service application data and data delivery instructions that instruct the terminating SPCS on how to deliver the service application data to the subscriber device. The central server addresses the request message to the subscriber, based on the subscriber's PSTN address, and transports the message to a "Generic Data Message Transport" (GDMT) application residing on the originating SPCS via a non-call associated ISDN interface or SMDI interface. The originating SPCS then encapsulates the request message in a typical TCAP message and transports the TCAP message to a Signaling Transfer Point (STP). In another embodiment of my invention, the central server has a CCS/SS7 interface and directly interfaces with the STP, bypassing the originating SPCS.

Regardless of whether the central server interfaces with the originating SPCS or STP, the STP resolves the subscriber's address for LNP related issues and subsequently routes the TCAP message to a GDMT application residing on the terminating SPCS. Upon receiving the TCAP message, the terminating SPCS extracts the application data and data delivery instructions from the generic request message and transports the application data as a generic data block to the subscriber device based on the data delivery instructions. Throughout the data transport, the application data is never examined by the PSTN infrastructure.

Optionally, the central server can instruct the terminating SPCS via the request message to report on the delivery status of the application data to the subscriber device. In this case, the terminating SPCS defines a response message, which contains the delivery status data, and transports this message through the STP back to the central server directly or through the originating SPCS.

In another embodiment of my invention, the central server broadcasts the service application data to multiple subscribers. In this embodiment, the central server continues to define a generic request message containing application data and data delivery instructions. Within the data delivery instructions is a list of subscriber PSTN addresses served by the terminating SPCS that are to receive the application data. The request message is addressed with one of these subscriber addresses and is transported to the STP as above. The STP resolves LNP related issues based on the single subscriber address and subsequently routes the message to the terminating SPCS. The terminating SPCS then delivers the application data as a generic data block to each subscriber device specified in the delivery instructions.

Because the STP only resolves a single address from the list of subscriber addresses, it is possible that one or more of the subscriber devices specified in the subscriber list are no longer served by the terminating SPCS. As a result, the terminating SPCS defines a response message for the central server specifying each subscriber device that did not receive the application data. The central server subsequently defines and delivers for each specified subscriber a request message containing the application data.

My invention has several advantages over the prior art. First, the central server has ubiquitous access to all subscriber devices within the PSTN. Second, data delivery does not require a call be established between the central server and subscriber devices and does not utilize the PSTN/SPCS switching fabric. As a result, switch congestion is avoided and the speed of data delivery is increased. Third, my invention provides an efficient method and means for the central server to broadcast data to multiple subscribers throughout the PSTN. Fourth, my invention accounts for number portability issues.

Another significant advantage of my invention over the prior art is that my invention focuses on an effective and efficient means by which the overriding service application data is "generic" to the PSTN switching components. Specifically, the PSTN switching components do not require embedded knowledge of the service application data being transported or how that data should be delivered to the subscriber device. The central server performs all data formatting based on the over-riding service application (a function typically performed by the terminating SPCS) and transports this data along with data delivery instructions to the terminating SPCS, which blindly passes the data to the subscriber device based on the delivery instructions. As a result, new service applications can be deployed completely on the central server and subscriber devices. These applications simply use the methods and apparatus of my invention as a framework infrastructure to communicate between the central server and subscriber devices. This arrangement significantly reduces the cost and time to deploy new services.

BRIEF DESCRIPTION OF THE DRAWINGS

FIG. 7 is a block diagram illustrating a specific application in accordance with the present invention.

DETAILED DESCRIPTION OF THE INVENTION 1.0 Overview

Figure 1:
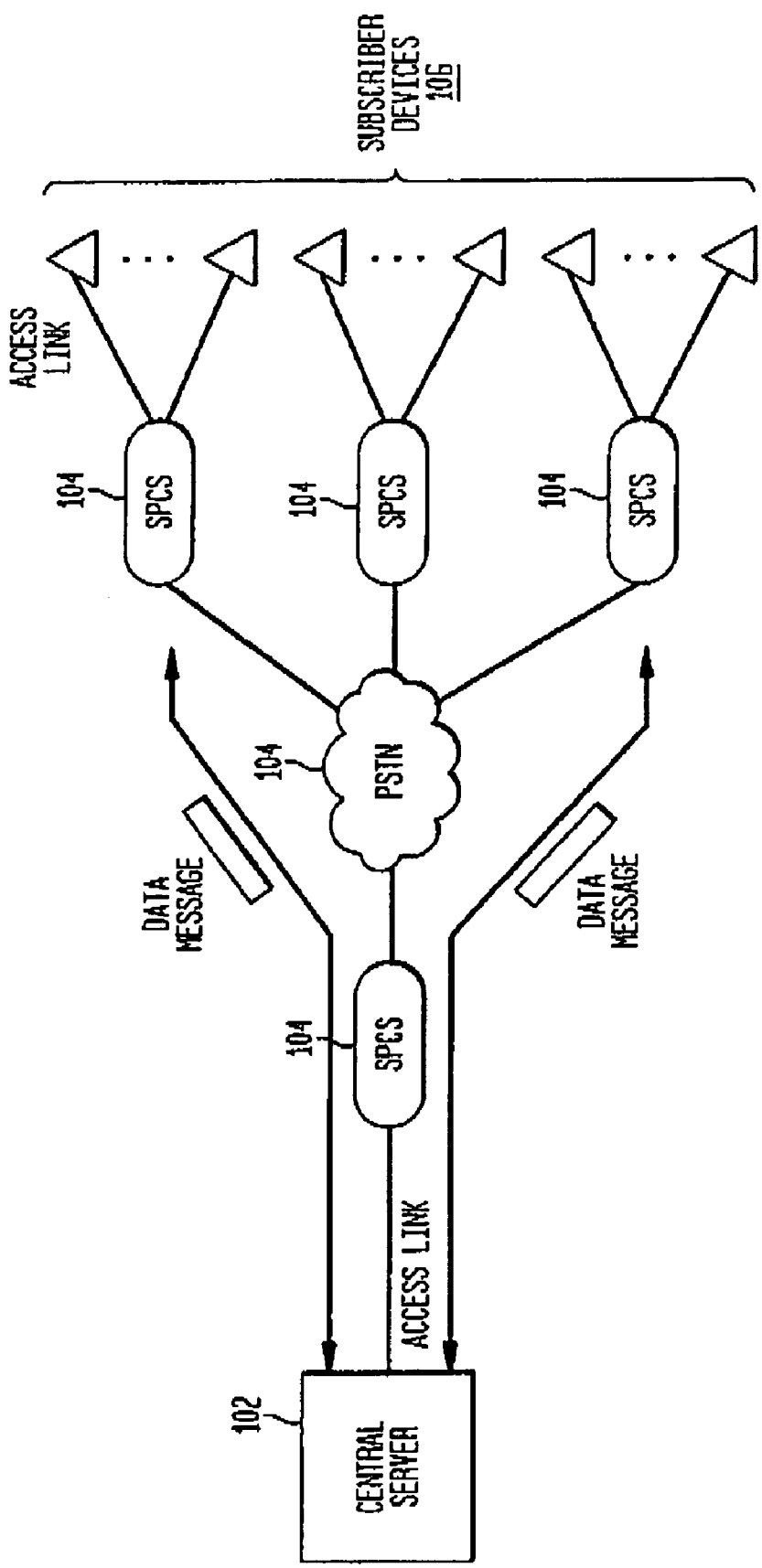
FIG. 1 is a conceptual diagram of transporting data from a central server to a plurality of subscriber devices via the PSTN.
Figure 2:
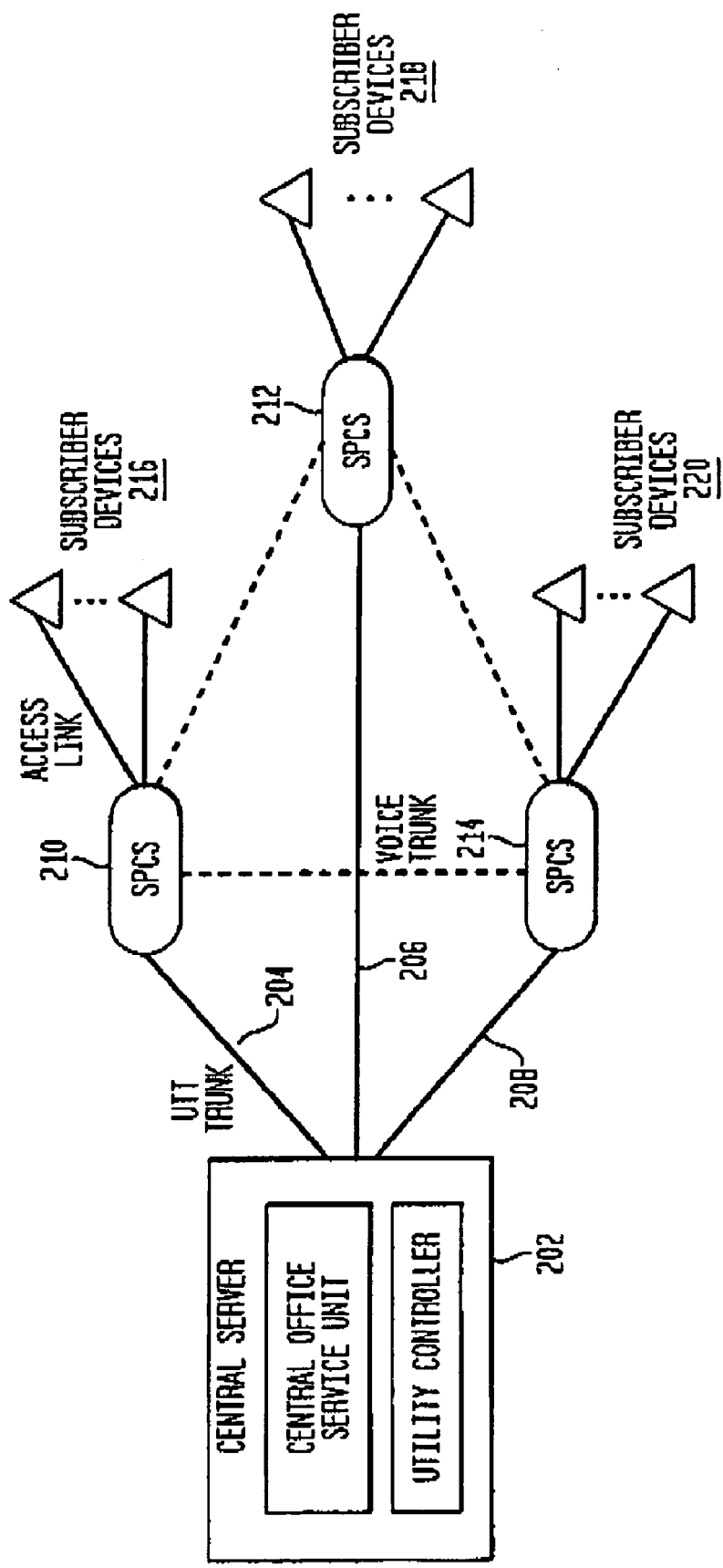
FIG. 2 is a block diagram illustrating a prior art system by Stuart Garland, U.S. Pat. Nos. 5,189,694 and 5,394,461.
Figure 3:
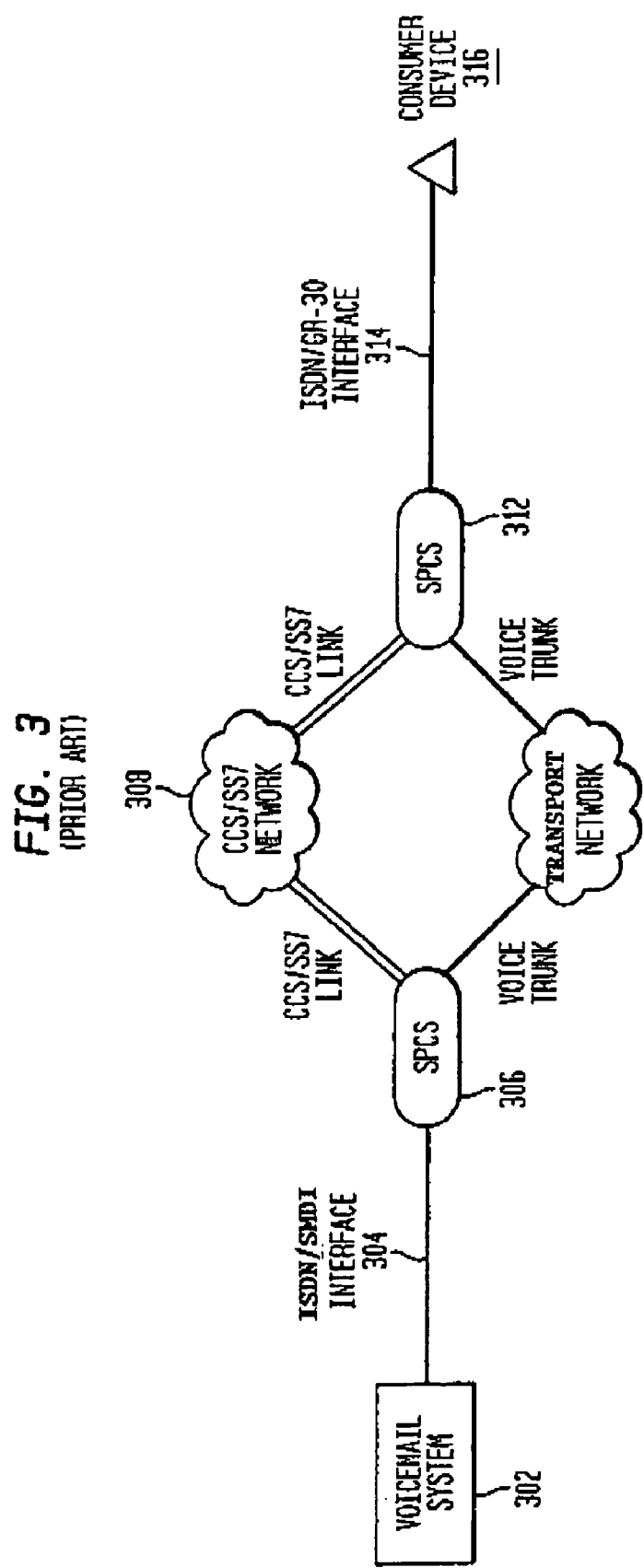
FIG. 3 is a block diagram illustrating a prior art voicemail system by Telcordia Technologies, Inc.
Figure 4:
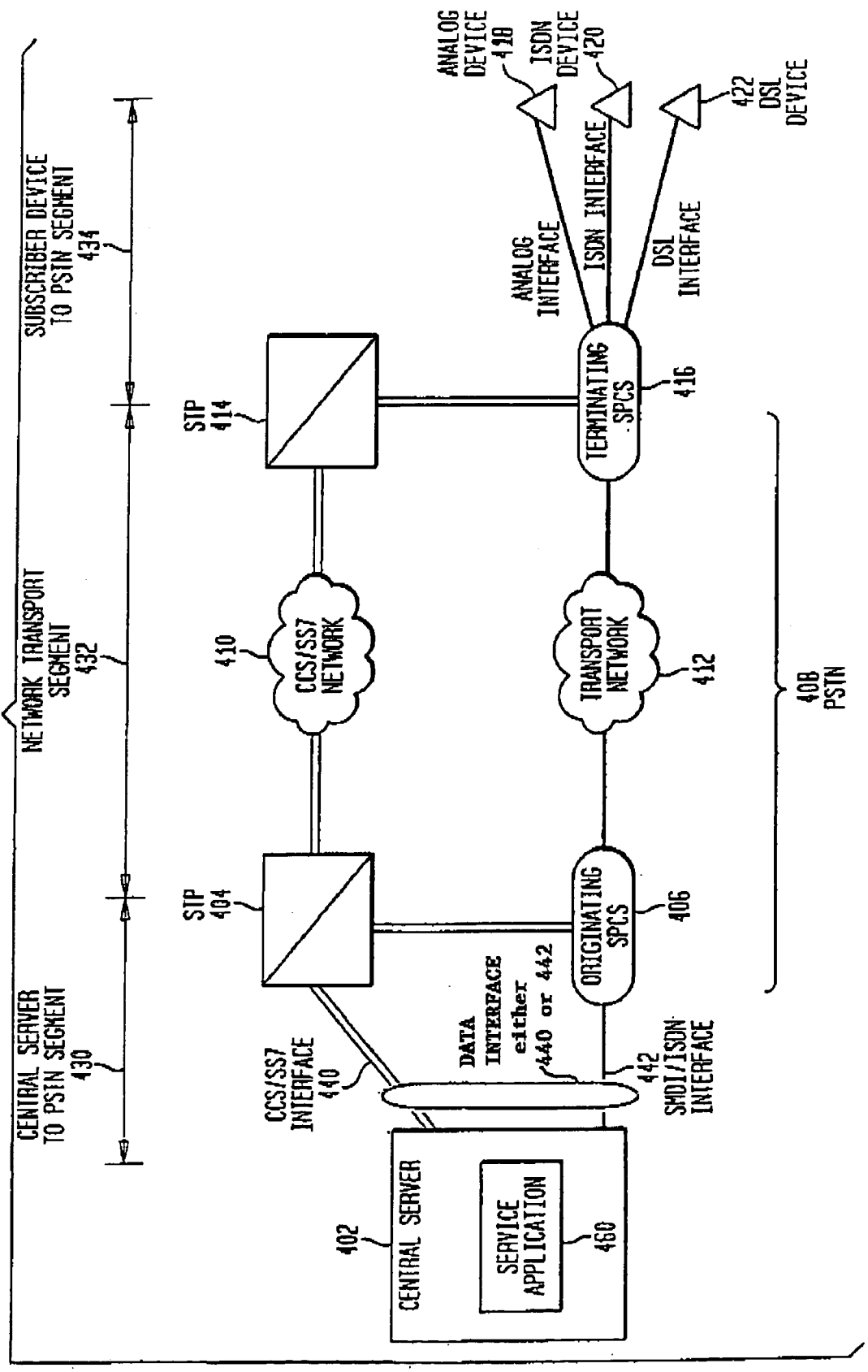
FIG. 4 is a block diagram illustrating the different segments of the network through which generic data is transported from the central server to the subscriber devices.

Reference will now be made in detail to the preferred embodiment of my invention. Turning to FIG. 4, there is depicted a PSTN architecture on which my invention is implemented. The system consists of a plurality of subscribers with CPE devices, such as devices 418–420, central server 402, and PSTN 408 for providing interconnection between the central server and the subscriber devices. PSTN 408 consists further of originating SPCS 406 serving central server 402, terminating SPCS 416 serving subscriber devices 418–420, STP's 404 and 414, transport network 412 supporting communications between subscribers, and CCS/SS7 signaling network 410. Central server 402 contains service application 460 intended to provide "data message services" to subscriber devices 418–422. The objective of my invention is to provide a generic transport mechanism, hereinafter referred to as the Generic Data Message Transport (GDMT) capability, from central server 402 to subscriber devices 418–422 through which service applications, such as service application 460, can transport data messages to the subscriber devices. Specifically, it is an objective of my invention to define methods and apparatus for the transport of data from central server 402 to subscriber devices 418–422 through the PSTN such that originating SPCS 406, terminating SPCS 416, STP's 404 and 414, CCS/SS7 network 410, and transport network 412 have no inherent knowledge of service application 460 or the data being transported. As such, my invention provides a generic framework on which any data message delivery applications can be deployed without modifying the PSTN infrastructure. It is a further objective of my invention that the data delivery occur without establishing a switched based call connection between central server 402 and CPE devices 418–422 and that the data delivery occur without subscriber interaction.

Hereinafter, the focus of this application is on the transport of "generic" data message from the central server to the CPE devices.

The GDMT system can be broken into three transport segments for discussion purposes. Segment 430 provides for generic data message delivery between central server 402 and PSTN 408. Central Server 402 accesses PSTN 408 either through originating SPCS 406 (through an ISDN or SMDI interface 442), or through STP 404 (through CCS/SS7 interface 440). Segment 434 provides for generic data message delivery between terminating SPCS 416 and subscriber CPE devices 418–422. Access over this segment is either through an analog interface, an ISDN interface, or a Digital Subscriber Loop (DSL) interface. Segment 432 provides for generic data message delivery between originating SPCS 406/STP 404 and terminating SPCS 416. Delivery over this segment is via the CCS/SS7 network.

Figure 5:
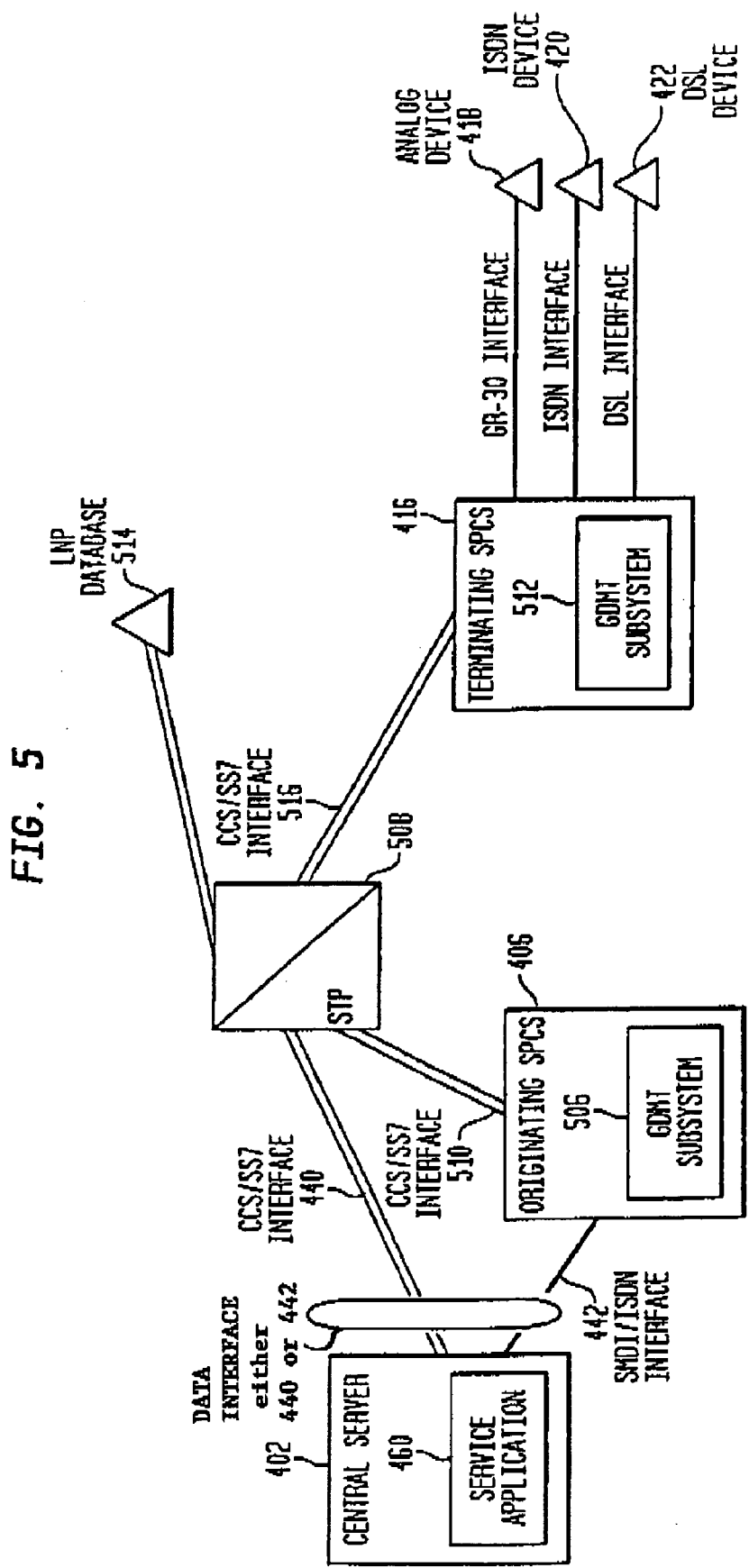
FIG. 5 is a block diagram illustrating a system suitable for execution of methods consistent with the present invention.

FIG. 5 shows a detailed diagram of one specific illustrative embodiment of the GDMT system. As an example, central server 402 wishes to send a generic data message, containing data generated by service application 460, to CPE device 418. Central server 402 formulates a generic message request consisting of both the service application data for subscriber 418 and delivery information, which instructs terminating SPCS 416 on how to deliver this message to subscriber 418. Central server 402 addresses the generic message for subscriber 418 using telephony based addressing and transfers this message to GDMT subsystem 506 on originating SPCS 406 over either ISDN or SMDI interface 442. Assuming subscriber 418 is not served by originating SPCS 406, GDMT subsystem 506 extracts the generic data message request (both the message and delivery instructions) from the data interface and transfers the request over the CCS/SS7 network to STP 508. Similarly, if central server 402 has CCS/SS7 capabilities, the central server can transfer the generic message request directly to STP 508 over CCS/SS7 interface 440. STP 508 resolves LNP related addressing issues through LNP database 514 and then routes the generic data message to GDMT subsystem 512 on terminating SPCS 416. GDMT Subsystem 512 extracts the delivery instructions and the service application data for subscriber 418 from the generic data message request. Subsequently, GDMT Subsystem 512 delivers the data to subscriber 418 based on the delivery instructions. Upon delivery, GDMT Subsystem 512 formulates a generic response message and conveys this message back to central server 402 through the network thereby informing the central server on the status of the delivery.

The following discussion will first cover the structure of the generic data message that is transferred between central server 402 and subscriber devices 418–422. The discussion will then specifically describe the method of transport of this generic data message over each transport segment.

2.0 Description of Generic Data Message Structure

One objective of the GDMT system is for the central server to define a generic data message and deliver this message to the subscriber without requiring intervening nodes within the network, such as the terminating SPCS, to have specific knowledge of the data message. As is further described below, once the generic data message is delivered to the terminating SPCS, there are different ways in which the terminating SPCS can deliver that message to the subscriber. As a result, another objective of my invention is for the central server to have flexibility in instructing the terminating SPCS on how to deliver the message to the subscriber. A third objective of my invention is for the terminating SPCS to send the central server a response indicating the delivery success or failure of the generic data message.

The first two objectives are satisfied through the "GenericDataMessageDeliveryRequest" structure and the third objective is satisfied through the "GenericDataMessageDeliveryResponse" structure, as defined below in Tables 1–4. The two structures allow for the creation of an environment where the application intelligence is severed from the internal network switching components, which are expensive and time consuming to update, and moved to the less costly edge components, comprising the central server and subscriber based CPE devices. As a result, future application development can take place by only modifying the edge components.

The GenericDataMessageDeliveryRequest structure is a message delivery request structure sent by the central server to the terminating SPCS and is defined as shown in Table 1. The structure is in ASN.1 format, an abstract data-structuring notation that is independent of any encoding technique. This structure can therefore serve as a generic definition that can be implemented in almost any communications protocol in the PSTN or packet/cell based networks.

The GenericDataMessageDeliveryRequest structure contains two elements. The first is the "genericDataMessage" element, which is either an octet or bit string and is the end-to-end generic data message containing the service application data that is to be delivered to the subscriber by the central server. The second element is "deliveryControlInfo," which is a structure of elements defined by the central server/service application that describe the manner in which the terminating SPCS should deliver the generic data message to the subscriber. Table 2 contains the "data type definitions" for each of the parameters of the DeliveryControlInfo structure as defined in Table 1.

TABLE 1

ASN.1 Representation of the Generic Data Message Delivery Request

| Structure Definition | Parameter Data Type | Parameter Definition |
|---|---|---|
| GenericDataMessageDeliveryRequest::= SEQUENCE { | | |
| genericDataMessage | [0]IMPLICIT GenericDataMessage | Contains the service application data to be delivered from the central server to the CPE device(s) |
| deliveryControlInfo | [1]IMPLICIT DeliveryControlInfo | Contains information instructing the terminating SPCS on how to delivery the generic data to the CPE device. |
| } | | |
| GenericDataMessage ::= Choice { | | |
| octetMessage | [0] IMPLICIT OCTET STRING | |
| bitMessage | [1] IMPLICIT BIT STRING | |
| } | | |
| DeliveryControlInfo ::= Sequence { | | |
| transactionID | [0] IMPLICIT INTEGER | Contains a numeric ID assigned by the central server and used to link the request and response messages |
| callingNumber | [1]IMPLICIT OCTET STRING (OPTIONAL) | Contains the directory number assigned to the central server interface. This element is |
| timestamp | [2]IMPLICIT OCTET STRING (OPTIONAL) | Contains the time and date when the central server launched the delivery request. This element is (OPTIONAL). |
| mSRID | [3]IMPLICIT OCTET STRING (OPTIONAL) | Contains an identifier for the central server or a subsystem in the central server that launched the generic data message request. This data element is (OPTIONAL). If provided, it shall be used by the terminating SPCS in the response message. |

TABLE 1-continued

ASN.1 Representation of the Generic Data Message Delivery Request

| Structure Definition | Parameter Data Type | Parameter Definition |
| --- | --- | --- |
| bearerCapability | [4]IMPLICIT OCTET STRING (OPTIONAL) | Describes the type of bearer service needed, if any. This element is (OPTIONAL). |
| pilotDN | [5]IMPLICIT OCTET STRING | Contains a 10-digit directory number of one subscriber that will receive the generic data message. The pilotDN is used for routing and LNP determination. |
| broadcastType | [6]IMPLICIT BroadcastType (OPTIONAL) | Describes three methods for specifying the directory numbers of the subscribers who will receive the generic data message for broadcast. The first method indicates a list of one or more specified directory numbers. The second method indicates a range of directory numbers within a NPA-NXX. The third method indicates an entire NPA-NXX available on a SPCS without specific mention of every directory number. This element is (OPTIONAL). If not included in the message, delivery to the single destination indicated by the pilotDN is assumed. |
| broadcastRange | [7]IMPLICIT BroadcastRange (OPTIONAL) | Specifies the inclusive start and stop range of directory numbers that will receive the generic data message when the broadcastType is set to range. This element is (OPTIONAL). |
| dNList | [8]IMPLICIT DNList (OPTIONAL) | Contains one or more directory numbers that will receive the generic data message when the broadcastType is a single or specified list of directory numbers. This element is (OPTIONAL). |
| messageRetries | [9] IMPLICIT INTEGER | Specifies the number of times a terminating SPCS shall re-attempt to deliver the generic data message to a subscriber before reporting a delivery failure. |
| subscriberLineType | [10]IMPLICIT SubscriberLineType (OPTIONAL) | Specifies the type of access line that is permitted to receive the generic data message. This element is (OPTIONAL). |
| deliveryMode | [11]IMPLICIT DeliveryMode | Specifies whether the terminating SPCS shall attempt to deliver the generic data message in the on-hook, off-hook or both states. For ISDN access lines, the on-hook state means no calls are in progress (i.e., no call associated call references). |
| transmissionFormat | [12]IMPLICIT TransmissionFormat (OPTIONAL) | Specifies the frame format and physical layer that the terminating SPCS should apply when delivering the generic data message. |
| byteFraming | [13] IMPLICIT ByteFraming | Specifies whether the terminating SPCS should frame bytes within the generic data message before delivery. |
| onHookAlertingSignalType | [14]IMPLICIT AlertingSignalType (OPTIONAL) | Specifies the type of alerting signal the terminating SPCS should apply before transmitting the generic data message in the on-hook state. This element defines a set of alerting signals. One or more alerting signals may be selected. The order in which they are encoded dictates the order of application. This allows |

TABLE 1-continued

ASN.1 Representation of the Generic Data Message Delivery Request

| Structure Definition | Parameter Data Type | Parameter Definition |
|---|---|---|
| | | numerous alerting combinations. This element is (OPTIONAL). If no alerting signal type structure is present, no alerting is to be applied during generic data message delivery. |
| offHookAlertingSignalType | [15]IMPLICIT AlertingSignalType (OPTIONAL) | Specifies the type of alerting signal the terminating SPCS should apply before transmitting the generic data message in the off-hook state. This element defines a set of alerting signals. One or more alerting signals may be selected. The order in which they are encoded dictates the order of application. This allows numerous alerting combinations. This element is (OPTIONAL). If no alerting signal type structure is present, no alerting is to be applied during generic data message delivery. |
| requireAlertingACK | [16]IMPLICIT DecisionYesNo | Specifies whether the terminating SPCS requires a CPE acknowledgment of the alerting signal before sending the generic data message. |
| reportAlertingACK | [17]IMPLICIT DecisionYesNo (OPTIONAL) | Specifies whether the terminating SPCS should report the detection of a CPE acknowledgment of the alerting signal to the central server. This element is only needed if a CPE acknowledgment of the alerting signal is required. |
| dialToneType | [18]IMPLICIT DialToneType (OPTIONAL) | Specifies the dial tone type the terminating SPCS should provide the subscriber upon going off-hook. This element is (OPTIONAL). |
| requireMessageACK | [19]IMPLICIT DecisionYesNo | Specifies whether the terminating SPCS requires an acknowledgment of the generic data message by the CPE. |
| reportMessageACK | [20]IMPLICIT DecisionYesNo (OPTIONAL) | Specifies whether the terminating SPCS reports the detection of a CPE acknowledgment of the generic data message. This element is only needed if a CPE acknowledgment of the generic data message is required. |
| forwardingControl | [21]IMPLICIT ForwardingControl | Specifies how the SPCS should handle delivery when encountering AIN triggers or features such as forwarding or terminating screening associated with a destination directory number. |

}

TABLE 2

ASN.1 Generic Data Message Delivery Request Data Element Descriptions

| Structure Definition | Parameter Data Type | Parameter Definition |
|---|---|---|
| BroadcastType::= ENUMERATED | | See Table 1. |
| { | | |
| listOfDNs | (0) | List of Dns |
| rangeOfDNs | (1) | Range of DNs |
| allDNs | (2) | All DNs within a NPA-NXX |
| } | | |

TABLE 2-continued

ASN.1 Generic Data Message Delivery Request Data Element Descriptions

| Structure Definition | Parameter Data Type | Parameter Definition |
|---|---|---|
| BroadcastRange::= SEQUENCE { | | See Table 1. |
|    dNRangeStart | [0] IMPLICIT OCTET STRING | The lower directory number in directory number range for message broadcast application. |
|    dNRangeStop | [1] IMPLICIT OCTET STRING | The upper directory number in a directory number range for message broadcast application. All directory numbers in between the start and stop directory numbers, inclusive, receive the generic data message. |
| } DNList ::= SET { | | See Table 1. |
|    dN | [0] IMPLICIT OCTET STRING | |
|    additionalDNs | [1] IMPLICIT SET OF DNList (OPTIONAL) | |
| } SubscriberLineType::= ENUMERATED { | | See Table 1. |
|    analog | (0) | |
|    ISDN | (1) | |
|    both | (2) | |
|    allTypes | (3) | |
| } DeliveryMode::= ENUMERATED { | | See Table 1. |
|    onHookOnly | (0) | |
|    offHookOnly | (1) | |
|    both | (2) | |
| } TransmissionFormat::= ENUMERATED { | | See Table 1. |
|    gr30GDMF | (0) | 1200 baud GR-30-CORE Generic Data Message Format. |
|    gr30GDMFWoCS | (1) | 1200 baud GR-30-CORE Generic Data Message Format without Channel Seizure Signal. |
|    gr30GDMFWoCSMS | (2) | 1200 baud GR-30-CORE Generic Data Message Format without Channel Seizure Signal and Mark Signal. |
|    gr30GDMF2400 | (3) | 2400 baud GR-30-CORE Generic Data Message Format. |
|    gr30GDMFWoCS2400 | (4) | 2400 baud GR-30-CORE Generic Data Message Format without Channel Seizure Signal. |
|    gr30GDMFWoCSMS2400 | (5) | 2400 baud GR-30-CORE Generic Data Message Format without Channel Seizure Signal and Mark Signal. |
|    iSDNDChannel | (6) | ISDN D Channel Layer 3 NOTIFY message encapsulation. |
|    dSLpacket | (7) | Transmission format using DSL packets. |
|    reservedFormat1 | (8) | Reserved Message Format. |
| } ByteFraming ::= ENUMERATED { | | See Table 1. |
|    startStopByteFraming | (0) | Frame each byte with a preceding start bit (space) and ending stop bit (mark). |
|    noFraming | (1) | Do not frame the data. Simply encapsulate it into the data frame. |
| } AlertingSignalType ::= SET { | | See Table 1. (Note: Signals get applied in the order in which they are coded) |
|    none | [0]IMPLICIT INTEGER (OPTIONAL) | No alerting signal. |

TABLE 2-continued

ASN.1 Generic Data Message Delivery Request Data Element Descriptions

| Structure Definition | Parameter Data Type | Parameter Definition |
|---|---|---|
|     openSwitchInterval | [1]IMPLICIT INTEGER (OPTIONAL) | INTEGER specifies the duration of line current interruption or removal of battery in ms (nominally 150 to 350 ms). |
|     lineReversal | [2]IMPLICIT INTEGER (OPTIONAL) | INTEGER specifies the duration of battery reversal in ms (nominally 150 to 350 ms). |
|     pingRing | [3]IMPLICIT INTEGER (OPTIONAL) | INTEGER specifies the duration of Power Ringing Burst in ms. |
|     otherRingType | [4]IMPLICIT OtherRingType (OPTIONAL) | A ringing pattern defined by OtherRingType. |
|     subscriberAlertingSignal | [5]IMPLICIT INTEGER (OPTIONAL) | INTEGER specifies the duration of a 440 Hz burst in ms (nominally 300 ms). |
|     otherSASType | [6]IMPLICIT OtherSASType (OPTIONAL) | A subscriber-alerting signal defined by OtherSASType. |
|     cPEAlertingSignal | [7]IMPLICIT INTEGER (OPTIONAL) | INTEGER specifies the duration of a 2130 Hz & 2750 Hz burst in ms; (nominally 80 ms, extended 250 ms). |
|     otherSignalType | [8]IMPLICIT OtherSignalType (OPTIONAL) | An alerting signal defined by OtherSignalType. |
| }<br>OtherRingType::= ENUMERATED<br>{ | | |
|     specialRingPattern | (0) | Power Ringing Cadence: 500 ms on, 250 ms off, 500 ms on, 250 ms off, 1000 ms on. |
|     distinctiveRingPattern | (1) | Power Ringing Cadence: 500 ms on, 250 ms off, 1000 ms on, 250 ms off, 500 ms on. |
|     codedRingPattern | (2) | Power Ringing Cadence: 800 ms on, 400 ms off, 800 ms on. |
| }<br>OtherSASType::= ENUMERATED<br>{ | | |
|     distinctiveSAS1 | (0) | 100 ms on, 100 ms off, 250 ms on, 100 ms off, 100 ms on of 440 Hz. |
|     distinctiveSAS2 | (1) | 100 ms on, 100 ms off, 100 ms on, 100 ms off, 250 ms on of 440 Hz. |
| }<br>OtherSignalType::=<br>ENUMERATED<br>{ | | |
|     voicebandSignal1 | (0) | Reserved |
|     voicebandSignal2 | (1) | Reserved |
|     voicebandSignal3 | (2) | Reserved |
| }<br>DecisionYesNo::=<br>ENUMERATED<br>{ | | See Table 1. |
|     no | (0) | |
|     yes | (1) | |
| }<br>DialToneType ::= ENUMERATED<br>{ | | See Table 1. |
|     steadyDialTone | (0) | Continuous application of 350 Hz & 440 Hz. |
|     messageWaitingDialTone | (1) | 100 ms on, 100 ms off repeated 10 times followed by continuous application of 350 Hz & 440 Hz. |
|     recallDialTone | (2) | 100 ms on, 100 ms off repeated 3 times followed by continuous application of 350 Hz & 440 Hz. |
| }<br>ForwardingControl ::= SET<br>{ | | See Table 1. |
|     controlType | [0] IMPLICIT ForwardCase | Defined by ForwardCase. |
|     moreControlTypes | [1]IMPLICIT SET OF ForwardingControl (OPTIONAL) | Defined by ForwardCase. |
| }<br>ForwardCase ::= ENUMERATED | | See Table 1. |

TABLE 2-continued

ASN.1 Generic Data Message Delivery Request Data Element Descriptions

| Structure Definition | Parameter Data Type | Parameter Definition |
|---|---|---|
| { | | |
|    noForwarding | (0) | Deliver generic data message to specified directory number and disregard all forwarding and artificial make-busy features. |
|    allowForwarding | (1) | Allow forwarding features to redirect delivery of generic data messages. |
|    disregardAINTriggers | (2) | Disregard any AIN triggers and deliver generic data message to specified directory number. |
|    disregardTerminating Screening | (3) | Disregard any terminating screening features and deliver generic data message to specified directory number. |
| } | | |

The second structure, GenericDataMessageDeliveryResponse, is a delivery response structure sent by the terminating SPCS to the central server and is defined as shown in Table 3. This structure is also defined in ASN.1 format. Looking at the fields of the message, "transactionID" is identical to the "transactionID" field in the GenericDataMessageDeliveryRequest structure and links the response to a request. "mSRID" is identical to the "mSRID" field in the GenericDataMessageDeliveryRequest structure and identifies the central server, or subsystem within the central server, that initiated the generic data message. "response" indicates, through the "Response" structure, the delivery success or failure of the data message to a subscriber(s)—specifically—"resultType" indicates, through the ResultType structure, the success or failure of delivery and the corresponding subscriber(s) are identified either through the "dNList," "broadcastRange" or "broadcastType" elements. Multiple sets of the Response structure can be combined into a single GenericDataMessageDeliveryResponse message thereby acknowledging multiple request messages. Table 4 provides a detailed description for each element of the ResultType structure.

TABLE 3

ASN.1 Representation of the Generic Data Message Delivery Response

| Structure Definition | Parameter Data Type | Parameter Definition |
|---|---|---|
| GenericDataMessageDeliveryResponse::= SEQUENCE | | |
| { | | |
|    transactionID | [0]IMPLICIT INTEGER | |
|    mSRID | [1]IMPLICIT OCTET STRING (OPTIONAL) | |
|    response | [2]IMPLICIT Response | |
| } | | |
| Response ::= SEQUENCE | | |
| { | | |
|    resultType | [0] IMPLICIT ResultType | |
|    dNList | [1] IMPLICIT DNList (OPTIONAL) | |
|    broadcastRange | [2]IMPLICIT BroadcastRange (OPTIONAL) | See Table 2 for BroadcastRange definition. |
|    broadcastType | [3]IMPLICIT BroadcastType (OPTIONAL) | See Table 2 for BroadcastType definition. |
|    more | [4]IMPLICIT SET OF Response (OPTIONAL) | |
| } | | |

TABLE 4

ASN.1 Representation of the ResultType Structure

| Structure Definition | Parameter Data Type | Parameter Definition |
|---|---|---|
| ResultType ::= ENUMERATED { | | |
|    successfulDeliveryOnHook | (0) | The generic data message has been successfully delivered to the directory numbers indicated in the dNList, broadcastRange or all numbers in the NPA-NXX (if the |

TABLE 4-continued

ASN.1 Representation of the ResultType Structure

| Structure Definition | Parameter Data Type | Parameter Definition |
|---|---|---|
| successfulDeliveryOffHook | (1) | broadcastType is allDNs in the off-hook mode). The generic data message has been successfully delivered to the directory numbers indicated in the dNList, broadcastRange or all numbers in the NPA-NXX (if the broadcastType is allDNs in the off-hook mode). |
| alertingACKReceived | (2) | The alerting signal, if specified in the delivery request message, was acknowledged by the directory numbers indicated in the dNList, broadcastRange or all numbers in the NPA-NXX (if the broadcastType is allDNs). |
| messageACKReceived | (3) | The message ACK, if required as specified in the delivery request message, was received from the directory numbers indicated in the dNList, broadcastRange or all numbers in the NPA-NXX (if the broadcastType is allDNs). |
| dNOutsideNPANXX | (4) | A directory number in the dNList has a NPA-NXX that is different from the pilotDN. |
| portedNumber | (5) | The directory numbers in the dNList or broadcastRange have been ported. |
| failureToDeliverRetriesExceeded | (6) | The directory numbers in the dNList or broadcastRange have not been delivered in the requested number of attempts. |
| generalDeliveryFailure | (7) | The directory numbers indicated in the dNList, broadcastRange or all numbers in the NPA-NXX (if the broadcastType is allDNs) have not received the generic data message. |
| dNUnassigned | (8) | The directory numbers indicated in the dNList or broadcastRange are unassigned (not in use). |
| invalidBroadcastRange | (9) | One or both of the directory numbers specified as the start and stop range are invalid. For example, the NPA-NXX of one or both of the range limits is different than the NPA-NXX of the pilotDN. |
| accessLineNotAllowed | (10) | The directory numbers in the dNList or broadcastRange have a line type that does not match the line type permitted in the delivery request message. |
| invalidTransmissionFormat | (11) | The transmission format specified is not supported for the subscriber line interface |
| errorInRequestMessage | (12) | An error exists in the request message (i.e., a critical parameter is missing) |
| } | | |

3.0 Transport Segment Descriptions

Thus far, the generic structure of the data message to be transferred between central server 402 and CPE devices 418–422 has been described. In general, central server 402 defines the GenericDataMessageDeliveryRequest structure containing both the generic data message\service application data (genericDataMessage) and instructions telling the terminating SPCS how to deliver this message to the CPE device(s) (deliveryControlInfo). Central server 402 transfers the GenericDataMessageDeliveryRequest structure over transport segment 430 to originating SPCS 406 and GDMT subsystem 506. GDMT subsystem 506 then transfers the structure over transport segment 432 to terminating SPCS 416 and GDMT subsystem 512. GDMT subsystem 512 extracts the genericDataMessage and deliveryControlInfo structures and sends the genericDataMessage structure over segment 434 to CPE device(s) 418–422 using the delivery instructions specified in the deliveryControlInfo structure. Based on the status of the delivery to the CPE devices, GDMT subsystem 512 then creates a GenericDataMessageDeliveryResponse structure containing the delivery status and returns this structure to central server 402.

Reference will now be made, in accordance with my invention, to how the request and response structures are transferred over each transport segment starting with segment 434 (subscriber access), then segment 430 (central server access), and lastly segment 432 (network transport segment).

3.1 Subscriber Access

As indicated earlier, the access interface between subscribers 418–422 and terminating SPCS 416 is either analog, ISDN, or DSL access. The method for analog and ISDN access will be described below. Because DSL interfaces contain both analog interface support and out of band packet communications support similar to ISDN, the methods described for analog and ISDN interfaces can readily apply to DSL interfaces. In addition to the analog and ISDN access description, a description of how the central server instructs the terminating SPCS as to which subscriber(s) are to receive the generic data message is provided.

Analog Access Interface

GR-30-CORE defines a data transmission method for analog access lines between a SPCS and a subscriber. The GR-30-CORE interface currently supports, for example, CLASS$^{SM}$ services such as Caller Identity Delivery, Calling Identity Delivery on Call Waiting, and Visual Message Waiting Indicator. Although it uses the voice-frequency-band between the subscriber and SPCS, a central feature of the GR-30-CORE interface is that it does not require the establishment of a call nor does it use the SPCS core-voice-switching-fabric.

The GR-30-CORE interface defines data formats and CPE data delivery options to which an over-riding service application on a terminating SPCS must conform. As a result, these data formats and delivery options must be embedded in the service application thereby making the application tied to a specific purpose and requiring service application development within the SPCS. This is the case with prior art systems like "Visual Message Waiting Indicator." Again, an objective of the GDMT system is to sever the over-riding service application from the terminating SPCS. A description of how my invention severs the GR-30-CORE data formats and delivery options from the overriding service application are now discussed, beginning with the data formats and then the delivery options.

The GR-30-CORE interface currently defines two data formats, Single Data Message Format (SDMF) and Multiple Data Message Format (MDMF), which must be used by the over-riding service application. The issue with these two "formats" is that they require a given service application to specifically format subscriber data according to that application. As a result, service application development must take place within the SPCS. Again, SPCS feature development has proven costly and time-consuming thereby affecting new feature rollout.

Figure 6:
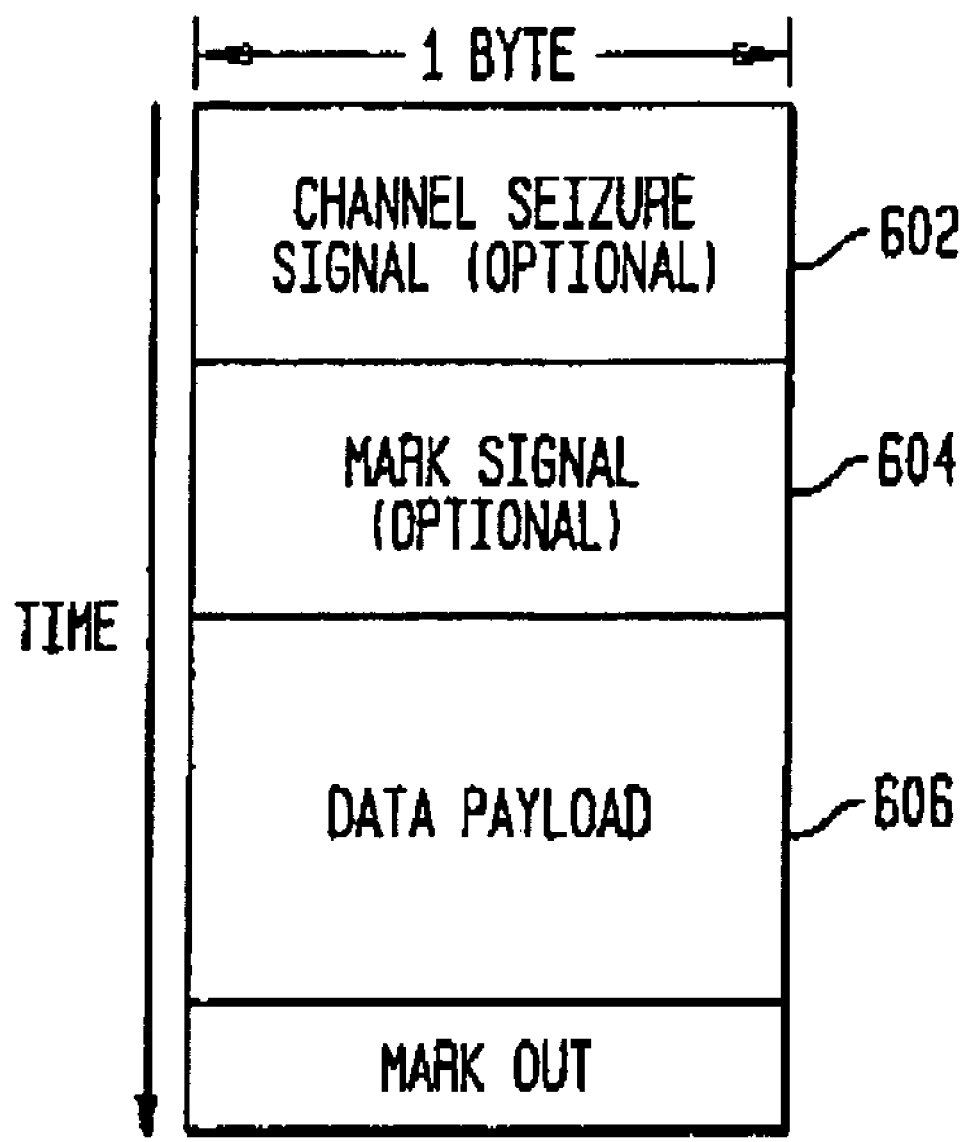
FIG. 6 is a block diagram illustrating the "Generic Data Message Format" for the GR-30-CORE interface.

An objective of the GDMT system is for the terminating SPCS to relinquish control of the over-riding service application and allow the central server to define the message as necessary and simply utilize the generic transport capabilities of the PSTN and terminating SPCS. In this respect, a new message format, called the "Generic Data Message Format" (GDMF), is defined for the GR-30-CORE interface as is illustrated in FIG. 6.

Unlike the SDMF and MDMF formats, the GDMF format allows for the transport of data by the terminating SPCS to the subscriber CPE device without requiring the terminating SPCS have specific knowledge of that data (Under the SDMF and MDMF formats, the terminating SPCS is required to format the subscriber data based on the specific application.). The GDMF format delivers a generic message in data payload 606 without requiring the terminating SPCS to perform segmentation or processing of the information, without requiring the SPCS to map different pieces of application data into specific parameters, and without requiring the SPCS to generate a checksum for error detection. The terminating SPCS is only required to perform a transport function; in other words, insert the generic data message received from the central server into data payload 606 of the GDMF envelope and transmit the frame to the CPE device using the physical layer defined in GR-30-CORE. Hence, under the current invention, GDMT subsystem 512 on terminating SPCS 416 extracts the genericDataMessage structure sent by the central server in the GenericDataMessageDeliveryRequest message and inserts it directly into data payload 606 of the GDMF envelope.

The GDMF format therefore allows the GR-30-CORE interface to transmit a data message completely defined by a central server. The advantage of this flexibility is that new services that require data delivery to analog access devices can be quickly introduced/deployed because they do not require a special SPCS application first be developed. Once a SPCS supports the GDMF feature and GDMT subsystem, this single feature can serve the needs of many new services. Furthermore, the GDMF format is cost effective because it uses the same physical layer as the SDMF and MDMF formats and thereby does not require hardware modifications to the SPCS.

Turning to the current GR-30-CORE delivery options, like the SDMF and MDMF data formats, the delivery options are currently hard-coded within the SPCS based service application. Under the current invention, rather than define only a single delivery option within GDMT subsystem 512, the central server defines the delivery options through the deliveryControlInfo structure and delivers these options to GDMT subsystem 512 along with the generic data message through the GenericDataMessageDeliveryRequest structure. GDMT subsystem 512 extracts the deliveryControlInfo structure and uses it to determine how the generic data message should be delivered to the subscriber. For example:

Through the "deliveryMode" parameter, the central server can instruct GDMT subsystem 512 to attempt to deliver the message only if the subscriber is in the on-hook state, only if the subscriber is in the off-hook state, or regardless of the state.

Depending on the state of the subscriber (on-hook, off-hook), the central server can specify to GDMT subsystem 512 the type of alerting signal to use through the "on HookAlteringSignalType" and "offHookSignalType" parameters. For example, in the on-hook case, the generic data message may be preceded by no alert, one of several ringing patterns, an Open Switching Interval (OSI), a battery reversal, a voiceband tone signal, etc. In the off-hook case, the SPCS must circumvent the call in progress. Here, the SPCS will break into the call, mute the far end party, and then apply an off-hook alerting signal consisting of no alert, Subscriber Alerting Signal (SAS) and a CPE Alerting Signal (CAS), voiceband tone signal, etc.

Through the "transmissionFormat" parameter, the central server can specify whether GDMT subsystem 512 should transmit the GDMF envelope with Channel Seizure Signal 602 and/or Mark Signal 604. These preamble signals are placed under the control of the central server because in service applications where delivery time is critical, such as broadcast applications, these two signals can take significant time to transmit. Through the "requireAlertingACK", "reportAlertingACK", "requireMessageACK", "reportMessageACK" parameters, the central server can instruct GDMT subsystem 512 to require the subscriber CPE to acknowledge receipt of the alerting signals and the generic data message, and then report the success or failure of the receipts back to the central server through the GenericDataMessageDeliveryResponse structure.

ISDN Access Interface

With respect to subscribers served by ISDN interfaces, delivering the generic data message is comparatively simpler than the method described above for subscribers served by analog access lines. The key difference is that the ISDN interface already supports out-of-band signaling via the D channel, which is used to pass all call control messages between the terminating SPCS and an ISDN terminal. Under my invention, when the central server delivers the GenericDataMessageDeliveryRequest structure to the terminating SPCS, the SPCS directly embeds the genericDataMessage structure and the deliveryControlInfo data into a Q.931 NOTIFY Message and as a result, like the GR-30-CORE interface, does not require the SPCS have specific knowledge of the data. The SPCS then delivers the NOTIFY Message using Non-Call Associated Signaling (NCAS), which allows the message to be sent at any time regardless of the state (on-hook, off-hook) of the interface.

Table 5 illustrates one method of encoding a Q.931 NOTIFY message containing the generic data message. This ISDN message is constructed as a call independent message using the NULL Call Reference Value. The key components include the Notification Indicator Information Element, the Signal Information Element, the Calling Party Number Information Element, and the Called Party Number Information Element. The genericDataMessage structure is placed directly in the "ASN.1 Encoded Data Structure" field of the Notification Indicator Information Element, again requiring no modification by the SPCS, and the Notification Description field is set to 03H (Extension to ASN.1 Encoded Component). The Signal information element is defined by mapping the alerting signal parameters (onHookAlertingSignalType and offHookAlertingSignalType) from the deliveryControlInfo structure, as describe above. The Calling Party Number Information Element is likewise populated based on the CallingNumber element from the deliveryControlInfo structure or, as an alternative, provided by the SPCS directly.

TABLE 5

| ISDN NOTIFY Message Coding | |
| --- | --- |
| Data Element | Value |
| Protocol Discriminator | Q.931 |
| Call Reference Value | Null ("0000 0000") - Non-call Associated Signaling |
| Message Type | NOTIFY |
| Bearer Capability Information Element | "0000 0100" Identifier |
| Bearer Capability | Call Independent Signaling Connection |
| Notification Indicator Information Element | "0010 0111" Identifier |
| Notification Description | "0000 0011" Extension to ASN.1 Encoded Component |

TABLE 5-continued

| ISDN NOTIFY Message Coding | |
| --- | --- |
| Data Element | Value |
| ASN.1 Encoded Data Structure | GenericDataMessage Structure (See Table 1) |
| Signal Information Element | "0011 0100" Identifier |
| Signal Value | AlertSignalType's mapped from the DeliveryControlInfo Structure (see Table 2) |
| Calling Party Number Information Element | "0110 1100" Identifier |
| Number | Calling Number provided either by the SPCS or the Central Server in the DeliveryControlInfo Structure (see Table 1) |
| Called Party Number Information Element | "0111 0000" Identifier |
| Number | DN Provided by the Central Server |

Note that regardless of whether the access interface is analog or ISDN, terminating SPCS 416 will need to determine if any "vertical services" are active on the subscriber line and route the generic data message based on the instructions in the "ForwardingControl" structure in the deliveryControlInfo structure. In addition, once the delivery (or attempted delivery) of the message to the subscriber(s) is complete, terminating SPCS 416 will formulate, if indicated by the deliveryControlInfo structure, a delivery status response via the GenericDataMessageDeliveryResponse structure and return this message to the central server via the CCS/SS7 network, which is further described below.

Designating a Subscriber

Before proceeding, it is beneficial to describe how the central server instructs GDMT Subsystem 512 on the terminating SPCS as to which subscriber(s) are to receive the message. As described thus far, the GDMT system supports delivery of generic data messages from the central server to a single subscriber. In this case, the central server specifies the target subscriber to the terminating SPCS through the "pilotDN" parameter of the deliveryControlInfo structure. However, in addition to supporting delivery of generic data messages to a single subscriber, another objective of my invention is to support broadcast capabilities from the central server to multiple subscribers (e.g., for emergency altering applications). Rather than the central server sending an individual message to every subscriber, as would be the case under the prior art systems, the central server sends one message to each terminating SPCS that serves subscribers that are to be reached along with a designation of these subscribers. Each terminating SPCS then forwards the message to the designated subscribers. The central server specifies the target subscribers to the SPCS in one of three ways through the deliveryControlInfo structure, as designated below.

1. All Directory Numbers within a List: Under this method, a list of directory numbers are specified in the "dNList" structure, specifying to the terminating SPCS as to which subscribers should receive the message.
2. All Directory Numbers within a Range: Under this method, a range of directory numbers is specified by a start and stop directory number in the "broadcastRange" structure.
3. All directory numbers within a single NPA-NXX: Under this method, an indicator is set to convey to the terminating SPCS that the generic data message is to be delivered to all directory numbers within a single NPA-NXX available on the SPCS.

Because broadcast occurs from the perspective of the terminating SPCS, the central server should first group the directory numbers according to a NPA-NXX so that a SPCS does not receive a delivery request for a subscriber it does not inherently serve.

3.2 Central Server Access

Central server 402 is responsible for creating, on behalf of the overriding service application, the GenericDataMessageDeliveryRequest structure consisting of the generic data message\service application data (i.e., genericDataMessage) and the instructions telling GDMT Subsystem 512 on terminating SPCS 416 how to deliver this message to the subscriber (i.e., deliveryControlInfo). Central server 402 transmits this message either to GDMT Subsystem 506 on originating SPCS 406 over data interface 442 (for subsequent delivery to the CCS network through STP 508), or directly to STP 508 over CCS/SS7 interface 440, if the central server has CCS/SS7 capabilities. Correspondingly, these interfaces are used to deliver the GenericDataMessageDeliveryResponse structure generated by GDMT Subsystem 512 on terminating SPCS 416 back to central server 402.

In accordance with my invention, the generic data messages are transferred over interface 442 between originating SPCS 406 and central server 402 either through an SMDI or ISDN interface. The next section describes how the GenericDataMessageDeliveryRequest and GenericDataMessageDeliveryResponse structures are transferred over these interfaces. The following section discusses how these structures are transferred over CCS/SS7 interface 440.

Simplified Message Desk Access Interface (SMDI)

SMDI is an analog data interface that uses an asynchronous serial transmission protocol to transfer 7 bit ASCII data. Because the GenericDataMessageDeliveryRequest and GenericDataMessageDeliveryResponse structures are binary based structures, the SMDI 7 bit ASCII protocol presents several challenges for transferring data. Consequently, a special transfer syntax (i.e., encoding rules) is needed to communicate the request and response messages between central server 402 and originating SPCS 406. The central server encodes the GenericDataMessageDeliveryRequest structure as follows:

"REQ:GDMT" Number-of-Digits Number-of-Elements Set-of-Elements "<Control D>"

REQ:GDMT is an operation and format tag, respectively, that indicates to the originating SPCS that the central server is wishing to invoke GDMT subsystem 506.

As indicated in Table 1, the GenericDataMessageDeliveryRequest structure is an ASN.1 sequence of elements consisting of an "octetMessage" or "bitMessage", and a "transactionID", "callingNumber", "timestamp", etc. Set-of-Elements is a list of these elements for the current message, the encoding of which is discussed below. Number-of-Elements is the number of elements in the list Set-of-Elements. Number-of-Elements represents this number as a string of ASCII digits (1 through 9). Number-of-Digits is a single ASCII digit (1 through 9) indicating the number of ASCII characters in the Number-of-Elements string.

As indicated, Set-of-Elements represents the sequence of elements, from both the genericDataMessage structure and the deliveryControlInfo structure, that constitutes the GenericDataMessageDeliveryRequest structure. Not all elements defined by the GenericDataMessageDeliveryRequest structure need to appear in the command sequence for every request since several of the elements are (OPTIONAL). The order of the elements in this field is arbitrary.

"<Control D>" signifies end-of-transmission to the originating SPCS.

Similarly, the GenericDataMessageDeliveryResponse structure sent from the originating SPCS to the central server is encoded as follows:

"<CR><LF>GDMT" Number-of-Digits Number-of-Elements transactionID mSRID Set-of-Elements "<CR><LF><Control D>"

"GDMT" indicates to central server 402 that the originating SPCS is sending a GenericDataMessageDeliveryResponse structure (i.e., sending back a response from an earlier request).

As indicated in Table 3, the GenericDataMessageDeliveryResponse structure is an ASN.1 sequence of elements consisting of a "transactionID", "mSRID", and "response" wherein "response" represents a sequence of elements through the "Response" structure (i.e., "resultType", "DnList", "broadcastRange", and "broadcastType"). Set-of-Elements represents the sequence of elements from the "Response" structure. As indicated earlier, multiple "Response" structures can be combined in the same GenericDataMessageDeliveryResponse, provided that each "Response" is reporting a status related to the same "transactionID" and "mSRID". As a result, the Set-of-Elements sequence consists of one or more sets of "Response" structures wherein a set is the "resultType" element and either a "dNList", "broadcastRange" or "broadcastType" element. The order of the elements in the sequence is always "resultType" first.

transactionID represents the "transactionID" element of the GenericDataMessageDeliveryResponse structure.

mSRID represents the "mSRID" element of the GenericDataMessageDeliveryResponse structure.

Number-of-Elements is the number of elements in the list Set-of-Elements. Number-of-Elements represents this number as a string of ASCII digits (1 through 9). Number-of-Digits is a single ASCII digit (1 through 9) indicating the number of ASCII characters in the Number-of-Elements string.

"<CR><LF><Control D>" signifies end-of-transmission to the central server.

Each of the elements, represented by Set-of-Elements above, that comprises the GenericDataMessageDeliveryRequest and GenericDataMessageDeliveryResponse structures can be classified as either a structure (includes: genericDataMessage, bearerCapability, onHookAlertingSignalType, and, offHookAlertingSignalType) or as a single parameter (all other elements, e.g., pilotDN, boadcastType, resultType, etc.). Structures can be further classified as an octet string/binary data or as a set-of-parameters. Accordingly, structures are encoded in one of two formats (format 1 for octet strings and format 2 for set-of-parameters):

1. Stag Number-of-Digits Byte-Length-Value ASCII-Encoded-Binary-Data
2. Stag Number-of-Digits Number-of-Parameters Set-of-Parameters Stag represents a two key character that identifies the structure type (e.g., genericDataMessage: "GM", offHookSignalType: "NA").

ASCII-Encoded-Binary-Data represents the octet string/binary data. The octet string must be re-formatted as 7 bit ASCII data in order to conform to the SMDI interface. Specifically, the transmitting application converts each 8-bit binary data byte into two 7-bit ASCII characters by splitting each 8-bit binary data byte into two 4-bit segments called "trailing nibbles." A leading nibble ("011") is pre-pended to each trailing nibble to create a 7 bit ASCII byte in the range of 30H to 3FH, representing ASCII '0' through '?'. The receiving application decodes the data by discarding the leading nibble on each ASCII byte and combining every two trailing nibbles to reassemble the 8 bit binary byte.

Byte-Length-Value represents the number of ASCII characters in the ASCII-Encoded-Binary-Data field. Number-of-Digits is a single ASCII digit (1 through 9) indicating the number of ASCII digits needed to represent the Byte-Length-Value.

Set-of-Parameters represents the set of parameters constituting a structure with multiple parameters. The encoding of parameters is described below.

Number-of-Parameters is the number of parameters in the set Set-of-Parameters. Number-of-Digits is a single ASCII digit (1 through 9) indicating the number of ASCII characters in the Number-of-Parameters string.

In both structures, it should be noted that the originating SPCS can parse the data by counting bytes or counting parameters and never needs to interpret the content of the message, thereby maintaining the objective of severing the overriding service application from the network infrastructure.

Parameters, whether represented as a single element or as a member of a structure, are encoded in one of two formats:
1. Ptag value "!"
2. Ptag value$_1$ "&" value$_2$ "&" . . . value$_n$ "!"

Ptag represents a two-character key that identifies the parameter type.

value, value$_1$, value$_2$, and value$_n$ contain one or more ASCII bytes representing the parameter value.

& is a delimiter of values when a parameter supports a list of values (e.g., dNList).

! is a delimiter when there are multiple parameters (e.g., onHookAlertingSignalType).

The encoding for structures and parameters for the GenericDataMessageDeliveryRequest structure and GenericDataMessageDeliveryResponse structure are shown in Table 6 and Table 7.

TABLE 6

Structure Encodings for the GenericDataMessageDeliveryRequest and GenericDataMessageDeliveryResponse Structures

| Structure | Stag | Binary Data or Parameter Encodings |
| --- | --- | --- |
| genericDataMessage | "GM" | ASCII encoded binary data representing the Data Message. |
| bearerCapabilty | "BC" | ASCII encoded binary data representing the Bearer Capability. |
| onHookAlteringSignalType | "NA" | openSwitchInterval: "Os ddd !" ddd: 3 ASCII digits representing the duration of the open switching interval between 000 and 999 ms. lineReversal: "LR eeee !" eee: 3 ASCII digits representing the duration of the line reversal between 000 and 999 ms. pingRing: "PR ffff" ffff: 4 ASCII digits representing the duration of the ping ring burst between 0000 and 9999 ms. otherRingType: specialRingPattern: "RT '0' !" distinctiveRingPattern: "RT '1' !" codedRingPattern: "RT '2' !" subscriberAlertingSignal: "SA kkkk !" kkkk: 4 ASCII digits representing the duration of the subscriber alerting signal between 0000 and 9999 ms. otherSASType: distinctiveSAS1: "AT '0' !" distinctiveSAS2: "AT '1' !" cPEAlertingSignal: "CA jjj !" jjj: 3 ASCII digits representing the duration of the CPE Alerting Signal reversal between 000 and 999 ms. otherSignalType voicebandSignal1: "OT '0' !" voicebandSignal2: "OT '1' !" voicebandSignal3: "OT '2' !" |
| offHookAlteringSignalType | "FA" | lineReversal: "LR eee !" eee: 3 ASCII digits representing the duration of the line reversal between 000 and 999 ms. subscriberAlertingSignal: "SA kkkk !" kkkk: 4 ASCII digits representing the duration of the subscriber alerting signal between 0000 and 9999 ms. otherSASType: distinctiveSAS1: "AT '0' !" distinctiveSAS2: "AT '1' !" cPEAlertingSignal: "CA jjj !" jjj: 3 ASCII digits representing the duration of the CPE Alerting Signal reversal between 000 and 999 ms. otherSignalType voicebandSignal1: "OT '0' !" voicebandSignal2: "OT '1' !" voicebandSignal3: "OT '2' !" |

TABLE 7

Parameter Encodings for the GenericDataMessageDeliveryRequest and GenericDataMessageDeliveryResponse Structures

| Parameter | Ptag | Parameter Encoding |
| --- | --- | --- |
| transactionID | "TD" | "TD xxxx !" xxxx: 4 ASCII Digits from '0' to '9' representing the Request ID |
| callingNumber | "CN" | "CN xxxxxxxxxx !" xxxxxxxxxx: 10 ASCII Digits from '0' to '9' representing the Calling Number. |
| timeStamp | "TS" | "TS YYYYMMDDhhmm !" YYYYMMDDhhmm: 12 ASCII Digits |

TABLE 7-continued

Parameter Encodings for the GenericDataMessageDeliveryRequest and GenericDataMessageDeliveryResponse Structures

| Parameter | Ptag | Parameter Encoding |
|---|---|---|
| | | from '0' to '9' wherein YYYYMMDDhhmm represents the year, month, day, hour, and minute, respectively. |
| mSRID | "ID" | "ID xxx !" xxx: 3 ASCII Digits from '0' to '9' representing the central server or subsystem identifier. |
| pilotDN | "PD" | "PD xxxxxxxxxx !" xxxxxxxxxx: 10 ASCII Digits from '0' to '9' representing the Pilot DN. |
| broadcastType | "BT" | listOfDNs: "BT '0' !" rangeOfDNs: "BT '1' !" allDNs: "BT '2' !" |
| broadcastRange | "BR" | "BR ssssssssss & tttttttttt !" ssssssssss: 10 ASCII Digits from '0' to '9' representing the starting directory number in the directory number range (dNRangeStart) tttttttttt: 10 ASCII Digits from '0' to '9' representing. the ending directory number in the directory number range (dNRangeStop) |
| dNList | "DN" | "DN aaaaaaaaaa & bbbbbbbbbb & . . . & zzzzzzzzzz" aaaaaaaaaa: 10 ASCII digits from '0' to '9' representing a directory number. bbbbbbbbbb: 10 ASCII digits from '0' to '9' representing another directory number. zzzzzzzzzz: 10 ASCII digits from '0' to '9' representing the last directory number. |
| messageRetries | "MR" | "MR x !" x: 1 ASCII digit from '0' to '9' representing message delivery retries. |
| subscriberType | "ST" | analog: "ST '0' !" ISDN: "ST '1' !" both: "ST '2' !" allTypes: "ST '3' !" |
| deliveryMode | "VM" | onHookOnly: "VM '0' !" offHookOnly: "VM '1' !" both: "VM '2' !" |
| transmissionFormat | "MF" | gr30GDMF: "MF '0' ! gr30GDMFWoCS: "MF '1' ! gr30GDMFWoCSMS: "MF '2' ! gr30GDMF2400: "MF '3' ! gr30GDMFWoCS2400: "MF '4' ! gr30GDMFWoCSMS2400: "MF '5' ! iSDNChannel: "MF '6' !" dSLpacket: "MF '7' !" reservedFormat1: "MF '8' !" |
| byteFraming | "BF" | startStopByteFraming: "BF '0' !" noFraming: "BF '1' !" |
| requireAckAlerting | "RA" | no: "RA '0' !" yes: "RA '1' !" |
| reportAckAltering | "PA" | no: "PA '0' !" yes: "PA '1' !" |
| dialToneType | "DT" | steadyDialTone: "DT '0' !" messageWaitingDialTone: "DT '1' !" recallDialTone: "DT '2' !" |
| requireMessageAck | "RM" | no: "RM '0' !" yes: "RM '1' !" |
| reportMessageAck | "PM" | no: "PM '0' !" yes: "PM '1' !" |
| forwardingControl | "FC" | noForwarding: "FC '0' !" allowForwarding: "FC '1' !" disregardAINTriggers: "FC '2' !" disregardRerminatingScreening: "FC '3' !" |
| resultType | "RS" | successfulDeliveryOnHook: "RS '0' !" successfulDeliveryOffHook: "RS '1' !" alertingACKReceived: "RS '2' !" messageACKReceived: "RS '3' !" dNOutsideNPANXX: "RS '4' !" |

TABLE 7-continued

Parameter Encodings for the GenericDataMessageDeliveryRequest and GenericDataMessageDeliveryResponse Structures

| Parameter | Ptag | Parameter Encoding |
|---|---|---|
| | | portedNumber: "RS '5' !" failuretoDeliverRetriesExceeded: "RS '6' !" generalDeliveryFailure: "RS '7' !" dNUnassigned: "RS '8' !" invalidBroadcastRange: "RS '9' !" accessLineNotAllowed: "RS '<' !" invalidTransmissionFormat: "RS '=' !" errorInRequestMessage: "RS '>' !" |

ISDN Access Interface

In accordance with my invention, the second way central server 402 and originating SPCS 406 exchange message requests and responses is through an ISDN Message Desk Interface (MDI). Similar to the ISDN interface between the terminating SPCS and subscriber, the MDI interface uses ISDN Non-Call Associated Signaling (NCAS) to transfer data. Under MDI access, central server 402 first establishes a NCAS connection with originating SPCS 406 through the use of an ISDN Q.931 SETUP message, the purpose of which is to obtain a non-call associated call reference to be used for the duration of the data delivery transaction. All subsequent ISDN D-channel messages exchanged between the central server and originating SPCS related to the current transaction use the same call reference. Upon completion of the transactions, the central server relinquishes use of the non-call associated call reference and releases the NCAS connection.

The GenericDataMessageDeliveryRequest and GenericDataMessageDeliveryResponse structures are transferred between central server 402 and originating SPCS 406 through the Facility Information Element (the encoding of which is described below). The initial request (i.e., the first GenericDataMessageDeliveryRequest structure sent by the central server) is transferred to originating SPCS 406 in either the initial NCAS SETUP message or through a subsequent FACILITY message. All subsequent GenericDataMessageDeliveryRequest and GenericDataMessageDeliveryResponse structures are transferred between central server 402 and originating SPCS 406 through a FACILITY message.

Regarding the specific encoding of the GenericDataMessageDeliveryRequest and GenericDataMessageDeliveryResponse structures within the Facility Information Element, each is encapsulated within the "Service Component" field. This encapsulation is performed through one of two methods. Under the first method, the structures are directly encoded using the "Basic Encoding Rules." For this method, a new "Protocol Profile" code must be defined (e.g., 10101). Under the second method, the Remote Operations Service Element (ROSE) procedures are followed. Under these procedures, the GenericDataMessageDeliveryRequest structure is encoded as a ROSE "Invoke" Component and tagged as a ROSE Operation. The genericDataMessage and deliveryControlInfo structures are encoded as ROSE arguments. The GenericDataMessageDeliveryResponse structure is encoded as either a Return Result Component or Return Error Component to indicate a successful or failed delivery, respectively. The GenericDataMessageDeliveryResponse elements are encoded as ROSE arguments.

3.3 Network Transport

Reference will now be made to how generic data message requests and responses are transported between originating SPCS 406 or central server 402 (when the central server has a CCS/SS7 interface) and terminating SPCS 416. As indicated earlier, the GDMT system uses the CCS/SS7 network to transport data through the PSTN network. Specifically, the originating SPCS or central server and terminating SPCS encapsulate the GenericDataMessageDeliveryRequest and GenericDataMessageDeliveryResponse structures into TCAP messages and transport these messages using the existing CCS/SS7 network infrastructure.

The use of the CCS/SS7 network and TCAP-messaging has several advantages over the prior art. First, the CCS/SS7 network provides a true network capability that allows the central server to reach any subscriber without requiring a direct interface with every SPCS in the network. Second, the CCS/SS7 network is a true data network and is therefore not hindered by the limited bandwidth of the PSTN voice trunks. Third, TCAP messaging is non-circuit related and can be transmitted without establishing a call, thereby avoiding call-setup delays. Lastly, as is further discussed below under the current invention, the GenericDataMessageDeliveryRequest and GenericDataMessageDeliveryResponse structures are encapsulated into the TCAP message without requiring the intermediate network nodes to have specific knowledge of the data.

The following sections will first generally discuss transport over the CCS/SS7 network. Next, the embedding of the GenericDataMessageDeliveryRequest and GenericDataMessageDeliveryResponse structures into TCAP messages is discussed. Finally, the routing of generic data request and response messages over the CCS/SS7 network is discussed with respect to both a single subscriber destination and broadcast.

Message Transport Over the CCS/SS7 Network

Under one embodiment of the GDMT system, central server 402 accesses the PSTN through originating SPCS 406 (through an SMDI or MDI interface), as presented above. Under a second embodiment, central server 402 accesses the PSTN through STP 508 through CCS/SS7 interface 440. Each of these embodiments is discussed below.

With respect to the first embodiment, GDMT Subsystem 506 within originating SPCS 406 accepts generic data message requests from central server 402 and embeds these requests, including both the genericDataMessage and deliveryControlInfo structures, into a TCAP message (assuming the message is destined for a subscriber(s) on another SPCS). GDMT Subsystem 506 addresses the message based on the "pilot DN" as specified by central server 402 and then transfers the message to STP 508 via CCS/SS7 interface 510. STP 508 resolves the "pilot DN" for local number portability issues and subsequently delivers the message to GDMT Subsystem 512 within terminating SPCS 416 through CCS/SS7 link 516. GDMT Subsystem 512 subsequently delivers the genericDataMessage to the subscriber based on the deliveryControlInfo, as described above. With respect to response messages, GDMT Subsystem 512 formulates the response structure, embeds the structure within a TCAP message, and transfers the response to GDMT Subsystem 502 via STP 508. GDMT subsystem 502 subsequently passes the response to central server 402 via SMDI/MDI interface 442.

With respect to the second embodiment, central server 402 formulates the request structure, embeds this structure directly into a TCAP message, addresses the message based on the subscriber's directory number, and transfers the TCAP message directly to STP 508 through CCS/SS7 interface 440, thereby completely bypassing originating SPCS 406. STP 508 and terminating SPCS 416 subsequently handle the request and response messages as described above with the exception that STP 508 passes the TCAP message containing the response directly to central server 402 rather than originating SPCS 406.

Formatting of the TCAP Message

Reference will now be made to the embedding of the GenericDataMessageDeliveryRequest and GenericDataMessageDeliveryResponse structures into a TCAP message. In general, TCAP messages are composed of three sub-units called the "Transaction Portion," the "Dialogue Portion," and the "Component Sequence Portion." The "Dialogue Portion" is unimportant for the purposes of my invention and is optional. The "Transaction Portion" and "Component Portion" are further discussed below with reference to each GDMT structure.

The TCAP encoding of the GenericDataMessageDeliveryRequest structure is shown in Table 8 (only the value portion of each element has been shown). The "Transaction Portion" consists of a "Package Type Identifier" and a "Transaction ID." The "Package Type Identifier" determines the exchange type and should be set to "Query with Permission." The "Transaction ID" is used to associate the TCAP message with a specific application transaction. It is assigned by originating SPCS 406 or central server 402, if central server 402 has direct connectivity to the CCS/SS7 network, and is used in all messages (request and response) related to a particular generic data message request.

Although TCAP allows multiple components to be stacked into the "Component Sequence Portion", the GDMT system uses only one component per TCAP message. For the GenericDataMessageDeliveryRequest structure, "Component Type" is set to "Invoke Component—Last." The "Invoke Component—Last" component consists of a "Component ID," an "Operation Code" (consisting further of the "Operation Family" and "Operation Specifier"), and a "Parameter Set." The "Operation Family" should be set to "Report Event Family Code" with a value of "1001010", the most significant bit being set to indicate that a response is required. The "Operation Specifier" should be set to a new value called the "GDMT Specifier", defined as "00000011", to indicate that a generic data message is to be delivered to one or more destination directory numbers. The "Parameter Set" contains the GenericDataMessageDeliveryRequest structure, which is coded as either a single new parameter or optionally as a set of parameters. Again, knowledge of the specific service application information is not needed to encode the information in the "Parameter Set". In addition, the "Parameter Set" is not examined by network nodes during transmission of the TCAP message. As a result, once again, intervening nodes of the PSTN network do not require embedded knowledge of specific service application information.

TABLE 8

TCAP Encoding of the GenericDataMessageDeliveryRequest Structure

| Sub-Unit Type | Sub-Unit Fields | Value |
|---|---|---|
| Transaction Portion | Package Type Identifier | "Query with Permission" |
| | Transaction ID | "Originating Transaction ID" |
| Dialogue Portion | | (OPTIONAL) |
| Component | Component Type | "Invoke Component Last" |
| Sequence Portion | Component ID | "Component ID" |
| | Operation Code — Operation Family | "Report Event Family Code" (1001010) |
| | Operation Specifier | "GDMT Specifier" (00000011) |
| | Parameter Set | GenericDataMessageDeliveryRequest Structure (includes genericDataMessage and deliveryControlInfo) |

The TCAP encoding of the GenericDataMessageDeliveryResponse structure is shown in Table 9 (only the value portion of each element has been shown). The "Package Type Identifier" should be set to "Response." The "Transaction ID" is set to the same value as the transaction ID in the corresponding generic data request in order to relate the response with the request.

The "Component Type" is set to one of two values, "Return Result—Not Last" and "Return Result—Last." "Return Result—Not Last" is used if more than one response message relating to the same transaction is sent by the terminating SPCS to the originating SPCS or central server (e.g., the terminating SPCS individually acknowledges delivery of a broadcast message to multiple subscribers). "Return Result—Last" is used to indicate the last response in a sequence of responses or if only one response is being sent to the originating SPCS or central server (e.g., the terminating SPCS batches all acknowledgments to a broadcast in a single GenericDataMessageDeliveryResponse structure). Neither "Component Type" contains an "Operation Code". Similar to the GenericDataMessageDeliveryRequest structure, the GenericDataMessageDeliveryResponse structure is coded as either a new parameter or optionally as a list of parameters.

TABLE 9

TCAP Encoding of the GenericDataMessageDeliveryResponse Structure

| Sub-Unit Type | Sub-Unit Fields | Value |
|---|---|---|
| Transaction Portion | Package Type Identifier | "Response" |
| | Transaction ID | "Responding Transaction ID" |
| Dialogue Portion | | (OPTIONAL) |
| Component Sequence Portion | Component Type | "Return Result - Not Last or Return Result - Last" |
| | Component ID | "Component ID" |
| | Parameter Set | GenericDataMessageDeliveryResponse Structure (may include multiple responses) |

Routing of TCAP Messages Through the CCS/SS7 Network

Reference will now be made to the routing of TCAP messages containing GenericDataMessageDeliveryRequest and GenericDataMessageDeliveryResponse structures through the CCS/SS7 network. As indicated earlier, the GDMT system supports delivery of generic data messages from the central server to a single subscriber or to multiple subscribers, through a broadcast capability. With respect to broadcast, the central server sends one message to each terminating SPCS that serves subscribers that are to be reached and the terminating SPCS in turn broadcasts the message based on the broadcast instructions specified in the deliveryControlInfo structure (as described in section 3.1). This broadcast method is more efficient than prior art systems wherein individual messages would need to be sent to every individual subscriber.

Whether a message is destined for a single subscriber or multiple subscribers through broadcast, the GDMT system uses the "pilotDN" parameter as the directory number by which TCAP messages containing message requests are routed through the CCS/SS7 network. For the single subscriber case, the pilotDN is the subscriber's address. For the broadcast case, the pilotDN is based on the method of broadcast. Specifically, when broadcast is through a "list" or "range" of directory numbers, the pilotDN is populated with a single random directory number from the "list" or "range". When broadcast is through all directory numbers within a single NPA-NXX, the pilotDN is an arbitrary number within the NPA-NXX.

Having chosen a value for the pilotDN, originating SPCS 406 or central server 402 sets the TCAP routing parameters as follows. The "destination point code" is set to the point code of STP 508 and the "origination point code" is set to the point code of originating SPCS 406 or central server 402, depending on the origin of the message. The GDMT system may require Global Title Translation (GTT) because originating SPCS 406 or central server 402 may not know the destination point code of terminating SPCS 416 or the SubSystem Number (SSN) that identifies GDMT subsystem 512. (If the central server knows the destination point code of terminating SPCS 416 and the SSN of GDMT subsystem 512, there is no need to use GTT). When GTT is required, it is enabled by setting the SCCP "Called Party Address Parameter" as follows. The "Routing Indicator" and "Global Title Indicator" fields of the "Address Indicator" should be set to indicate that routing takes place on global title. The "Global Title" of the "Called Party Address" field should be set such that the "Address" is the first 6 or 10 digits of the pilotDN and the "Translation Type" is preferably "251" (since this value has already been defined for CLASS services, or a new Translation Type can be used). Lastly, the SCCP "Calling Party Address Parameter" should be set to the SSN and signaling point code of originating SPCS 416 or central server 402, depending on the origin of the message.

Upon configuring the routing parameters of the TCAP message, originating SPCS 406 or central server 402 sends the message to STP 508, which first determines if the pilotDN is ported and then subsequently completes GTT. The handling of number portability is slightly different depending on whether the request message is destined for a single subscriber or multiple subscribers. Under both scenarios, STP 508 uses the pilotDN (i.e., the contents of the "Called Party Address" parameter) to determine whether the corresponding NPA-NXX is portable by performing a table look-up within the STP. If the NPA-NXX is portable, STP 508 proceeds to launch a query to LNP Database 514 where a full 10-digit look-up on the pilotDN is performed to determine if that particular directory number has ported. If the number has ported, LNP Database 514 returns to STP 508 the Local Routing Number (LRN) of the new terminating SPCS. Following the LNP analysis, or if the NPA-NXX is not portable, or if the pilotDN is not ported, STP 508 follows normal routing procedure and completes the GTT by determining and populating the SSN and the destination point code of terminating SPCS 416. The GenericDataMessageDeliveryRequest TCAP message is then sent to terminating SPCS 416.

When the request message is destined for a single subscriber, terminating SPCS 416 delivers the message using the directory number specified in the deliveryControlInfo structure, as specified earlier. Upon completing delivery of the message, terminating SPCS 416 formulates a GenericDataMessageDeliveryResponse structure to report success or failure and encapsulates the response in a TCAP response message, which is addressed/routed back to originating SPCS 406 or central server 402.

Because of LNP related issues, the handling of broadcast messages by terminating SPCS 416 is slightly different than that of single subscriber messages. The PSTN is designed to perform LNP queries and route CCS/SS7 messages based on a single directory number. The PSTN has no present capabilities to perform multiple queries on a list or range of directory numbers. As a result, STP 508, as was discussed above, performed LNP analysis on a pilotDN that was used to represent the broadcast list. Although an LNP query is performed, other directory numbers in the broadcast list, range, or NPA-NXX may have ported to SPCS's other than the SPCS serving the pilotDN representing the list. As a result, as terminating SPCS 416 attempts to deliver the generic data message to the directory numbers specified in the list, range, or entire NPA-NXX, the SPCS may encounter a directory number(s) that have been ported and it no-longer serves. In this case, terminating SPCS 416 generates a GenericDataMessageDeliveryResponse TCAP message back to central server 402 using the response code, "portedNumber," along with a list of directory numbers that did not receive the message because they were ported. Since each of these directory numbers requires an LNP query to properly route it to its serving SPCS, central server 402 generates (i.e., repeats) individual GenericDataMessageDeliveryRequest messages for each ported number using the single number addressing mode. TCAP messages with single number addressing will always be routed to the correct destination SPCS. An intelligent central server could record when a directory number is reported as having been ported and only apply single number addressing for generic data messages destined to it in the future.

4.0 A First Specific GDMT Service Application Example

Reference will now be made to a specific service, called Deluxe Messaging Notification Service, in accordance with my invention and based on the GDMT invention described above. Again, the advantage of my invention is that once deployed, it allows complex and diverse services, like the Deluxe Messaging Notification Service, to be completely implemented at the end-points of the network within the subscriber equipment and a "central server" without modification to expensive and difficult to modify network devices.

The Deluxe Messaging Notification Service, as shown in FIG. 7, is an advanced network feature that complements Unified Messaging services. Under this service, multi-functional server 704 (i.e., central server) is dually connected to PSTN 706, using one of the GDMT interfaces described above, and to Internet 702 using, for example a TCP/IP connection. Multi-functional server 704 supports a Unified Messaging Service whereby it receives voice and fax messages from PSTN 706 over interface 716, and email, faxes, pages, short text messages, and "Internet Telephony" based voicemails from Internet 702 through Internet connection 714. Whenever a new message is left for a subscriber of the service, multi-function server 704 notifies the subscriber by transferring "notification data" to terminating SPCS 708 and subsequently to a screen based device 712 on the subscriber's access line using the methods described under the current invention. The screen-based device could be an enhanced caller ID device, an ADSI or Internet screenphone, an ISDN phone, a set top box, or a personal computer, etc.

The GDMT system makes it possible for multi-functional server 704 to provide the subscriber with (1) a visual or audible alert that new messages are waiting; (2) an indication of both the type and number of messages waiting (e.g., 6 voicemail, 3 email, 1 fax, 2 pages); (3) information on who sent the message (e.g., the calling party number, the calling party name, or the sender's email address); (4) information on the message subject (e.g., the email subject header, a short voice-to-text conversion of a voicemail originator's verbal response to a prompted voicemail purpose tag line); and, (5) message detail (e.g., the date and time the message was received, the duration of the message, the size of an email message, the message priority, etc.). The advantage of the Deluxe Messaging Notification Service is that rather than constantly checking the multi-functional server for messages, subscribers are notified on a CPE device that messages are waiting.

In addition, multi-functional server 704 could support "Community Notification" Services", "Push Information Services," and "ADSI Service Script Upgrades" based on the GDMT system. Through Community Notification Services, multi-functional server 704 could notify selective groups of subscribers of pending weather conditions, missing children, etc. by sending community notifications. Under "Push Information Services," corporations could send sale-adds, stock quotes, etc. to multi-functional server 704 as is done today under push technologies. In turn, multi-functional server 704 would send the information to corresponding subscribers of the service. Under "ADSI Service Script Upgrades," multi-functional server 704 could send ADSI script upgrades to ADSI based phones.

5.0 A Second Specific GDMT Service Application Example

In another embodiment of my invention, the GTT routing table at a STP could be updated such the generic request messages are routed to a monitor or service profiler. Under the monitor application, a monitor-system would terminate the generic request message from a central server and analyze its contents. Subsequent to the analysis, the monitor system would regenerate the request message to its original intended destination, as if it was originating from the central server. All generic response messages generated by the terminating SPCS would likewise terminate at the monitor, which would subsequently regenerate them to the central server. The monitor-system could perform such functions as authorizing, delaying, and tracking generic request messages before they are forwarded to their intended destination.

Under the service profiler application, a service profiler system would terminate the generic request messages, extract the generic data contents, and forward the generic data contents to a pager or wireless device over a wireless network.

6.0 Specific GDMT AIN Example

In accordance with my invention, a new AIN function called "Send_GDM" can be created to transport generic data messages between AIN elements, such as service control points and service switching points. The Send_GDM function would contain the content of the generic data message and the delivery instructions. As demonstrated for the SMDI and MDI interfaces, the ASN.1 GenericDataMessageDeliveryRequest and GenericDataMessageDeliveryResponse structures can be readily encoded to suit the needs of an AIN message.

What is claimed is:

1. A method for delivering data from a service application to a subscriber device by means of a Public Switched Telephone Network (PSTN) comprising an originating node and a terminating node, wherein the service application interfaces the PSTN through the originating node and the subscriber device interfaces the PSTN through the terminating the PSTN has no embedded knowledge of the service application, and without establishing a call, said method comprising the steps of:
- creating a request message at the service application wherein the request message comprises the data and data delivery instructions;
- transporting the request message from the central server to the PSTN over the originating node-service application interface;
- routing the request message from the originating node to the terminating node via a Transaction Capabilities Application Part (TCAP) message without said originating and terminating nodes examining the data or requiring knowledge of the data;
- transporting the data from the terminating node to the subscriber device over the terminating node-subscriber device interface based on the data delivery instructions;
- defining a response message at the terminating node wherein the response message comprises status data indicating the status of the delivery of the data to the subscriber device; and
- routing the response message from the terminating node to the service application.

2. The method of claim 1 wherein the originating node-service application interface is a Simplified Message Desk Interface.

3. The method of claim 1 wherein the originating node-service application interface is a Non-call Associated Signaling Integrated Services Digital Network interface.

4. The method of claim 1 wherein the terminating node-subscriber device interface is a GR-30-CORE interface.

5. The method of claim 1 wherein the terminating node-subscriber device interface is a Non-call Associated Signaling Integrated Services Digital Network interface.

6. The method of claim 1 wherein the terminating node-subscriber device interface is a Digital Subscriber Loop interface.

7. The method of claim 1 wherein the step of routing the request message is based on a PSTN address of the subscriber device and includes the steps of:
- obtaining a Local Routing Number if the address has been ported; and
- routing the request message based on the Local Routing Number if the address has been ported.

8. The method of claim 1 wherein transporting the data to the subscriber device occurs regardless of whether the subscriber device is off-hook or on-hook.

9. The method of claim 1 wherein transporting the data to the subscriber device does not require subscriber interaction.

10. The method of claim 1 wherein the PSTN further comprises a packet switch and the service application interfaces the PSTN through the packet switch, wherein the step of transporting the request message from the service application to the PSTN occurs through the packet switch, and wherein the step of transporting the response message from the PSTN to the service application occurs from the packet switch.

11. The method of claim 1 wherein the step of transporting the data to the subscriber device further includes the step of over-riding vertical services defined for the terminating node-subscriber device interface based on the data delivery instructions.

12. A method for delivering data from a central server to a subscriber device by means of a PSTN based node, wherein the central server interfaces the PSTN, and wherein the node does not examine and has no embedded knowledge of the data, said method comprising the steps of:
- defining a request message at the central server wherein the request message comprises the data and data delivery instructions instructing the node on how to deliver the data to the subscriber device;
- transporting the request message from the central server to the node without establishing a call; and
- delivering the data to the subscriber device based on the data delivery instructions.

13. The method of claim 12 further including the steps of:
- recording in a response message the status of the delivery of the data to the subscriber; and
- transporting the response message to the central server.

14. The method of claim 12 wherein a user of the subscriber device establishes a voice-band connection as a result of receiving the data.

15. The method of claim 14 wherein the user retrieves information over the voice-band connection.

16. The method of claim 12 wherein the subscriber device automatically establishes a connection as a result of receiving the data and retrieves information over the connection.

17. A method for broadcasting data from a central server to a plurality of subscriber devices by means of a PSTN based node, wherein the central server interfaces the PSTN, and wherein the node does not examine and has no embedded knowledge of the data, said method comprising the steps of:
- defining a request message at the central server wherein the request message comprises the data and data delivery instructions, whereby the delivery instructions specify to the node a list of possible subscriber devices served by the node that should receive the data;
- routing the request message from the central server to the node without establishing a call; and delivering the data, based on the delivery instructions, to the list of subscriber devices.

18. The method of claim 17 wherein the list of subscriber devices specified in the request message is specified as a range of addresses.

19. The method of claim 17 wherein the list of subscriber devices specified in the request message is specified as all numbers within a NPA-NXX available on the node.

20. The method of claim 17 wherein transporting the data to each subscriber device occurs regardless of whether the subscriber device is off-hook or on-hook.

21. The method of claim 17 wherein transporting the data to each subscriber device does not require subscriber interaction.

22. The method of claim 17 wherein the plurality of subscriber devices are served by a plurality of nodes, said method further comprising the steps of:
defining a plurality of request messages at the central server, one request message per node, wherein each request message comprises the data and data delivery instructions whereby the delivery instructions specify to the corresponding node a list of possible subscriber devices served by the node that should receive the data;
routing each request message to its node; and
transporting, at each node, the data to the corresponding list of subscriber devices based on the data delivery instructions.

23. The method of claim 22 wherein a community notification service resides on the central server, said method broadcasting community notification information to the plurality of subscriber devices.

24. The method of claim 17 further including the steps of:
defining at the node a response message comprising the individual subscriber devices to which the node could not deliver the data because said subscriber devices had been ported;
transporting the response message from the node to the central server;
defining a plurality of request messages at the central server to cover the subscriber devices specified in the response message, wherein each request message comprises the data and data delivery instructions; and
delivering the plurality of request messages to nodes serving the ported subscriber devices.

25. The method of claim 17 further comprising routing the request message based on a PSTN address of one of the subscriber devices specified in the list of subscriber devices.

26. A method for enhancing Unified Messaging Services wherein a multi-functional server interfaces both a PSTN and an Internet and a subscriber device interfaces the PSTN through a switch, and wherein the multi-functional server receives subscriber messages from the PSTN and Internet, said method comprising the steps of:
defining a request message at the multi-functional server wherein the request message comprises data concerning the subscriber messages received from the PSTN and Internet, and wherein the request message further comprises delivery instructions instructing the switch on how to deliver the data to the subscriber device; without said switch examining the data or having knowledge of the data;
transporting the request message from the multi-functional server to the switch without establishing a call; and delivering the data to the subscriber device based on the data delivery instructions.

27. The method of claim 26 wherein a commercial Web server is interfaced to the Internet, said method further comprising the steps of:
pushing data from the commercial Web servers to the multi-functional server; and
wherein the defined request message comprises the data pushed from the commercial Web Server.

28. The method of claim 26 wherein a user of the subscriber device, as a result of receiving the data, establishes a connection to the multi-functional server and retrieves the PSTN and Internet messages.

29. The method of claim 26 wherein the subscriber device, as a result of receiving the data, automatically establishes a connection to the multi-functional server and retrieves the PSTN and Internet messages.

30. A method for delivering data from a central server to a wireless device by means of a PSTN based node, a service profiler, and a wireless network, wherein the service profiler is interfaced to both the node and the wireless network, wherein the central server interfaces the PSTN, and wherein the node does not examine and has no embedded knowledge of the data, said method comprising the steps of:
defining a request message at the central server wherein the request message comprises the data and data delivery instructions;
transporting the request message from the central server to the node without establishing a call;
delivering the data to the service profiler based on the data delivery instructions; and
delivering the data from the service-profiler to the wireless device via the wireless network.

31. A PSTN based node within a system for delivering data to subscriber devices:
means for receiving a request message wherein the request message node comprises the data and data delivery instructions; and
means for delivering the data to one or more subscriber devices without establishing a call according to the data delivery having knowledge of the data format and without examining the data.

32. The node of claim 31 wherein the system further comprises means for creating and transmitting a response message.

33. A method executed by a service application for sending data through a PSTN, said method comprising:
creating a message wherein the message comprises the data; and
transmitting said message without establishing a call, wherein the service application resides outside the PSTN and wherein the message further comprises customized delivery options for instructing the PSTN on how to deliver the data without the PSTN examining the data or having embedded knowledge of the data.

34. The method of claim 33 further comprising the step of receiving a response message comprising response data.

* * * * *